US012689273B2

(12) United States Patent　(10) Patent No.: US 12,689,273 B2
Cao et al.　(45) Date of Patent:　Jul. 21, 2026

(54) BROADBAND VIBRATION MOTOR WITH CASE, VIBRATOR AND COIL, AND AT LEAST ONE RESET PART ARRANGED OPPOSITE THE VIBRATOR

(71) Applicant: Suzhou Thor Electronic Technology Co., Ltd., Jiangsu (CN)

(72) Inventors: Hongbin Cao, Jiangsu (CN); Juan Chen, Jiangsu (CN)

(73) Assignee: Suzhou Thor Electric Technology Co., Ltd., Jiangsu (CN)

( * ) Notice: Subject to any disclaimer, the term of this patent is extended or adjusted under 35 U.S.C. 154(b) by 269 days.

(21) Appl. No.: 18/566,101

(22) PCT Filed: Mar. 16, 2022

(86) PCT No.: PCT/CN2022/081133
§ 371 (c)(1),
(2) Date: Dec. 1, 2023

(87) PCT Pub. No.: WO2022/252751
PCT Pub. Date: Dec. 8, 2022

(65) Prior Publication Data
US 2024/0275251 A1　Aug. 15, 2024

(30) Foreign Application Priority Data

| Jun. 3, 2021 | (CN) | .......................... | 202121238105.2 |
| Aug. 4, 2021 | (CN) | .......................... | 202110891217.6 |
| Aug. 12, 2021 | (CN) | .......................... | 202110923066.8 |
| Sep. 10, 2021 | (CN) | .......................... | 202111062238.3 |
| Sep. 10, 2021 | (CN) | .......................... | 202111063975.5 |

(51) Int. Cl.
*H02K 33/02*　(2006.01)
*C10M 101/00*　(2006.01)
(Continued)

(52) U.S. Cl.
CPC ........... *H02K 33/16* (2013.01); *C10M 101/00* (2013.01); *C10M 129/68* (2013.01);
(Continued)

(58) Field of Classification Search
CPC ........ H02K 33/16; H02K 33/18; H02K 33/00; H02K 35/02; H02K 35/00; H02K 35/04;
(Continued)

(56) References Cited

U.S. PATENT DOCUMENTS 7,498,681 B1 * 3/2009 Kellogg ................. H02K 35/02
290/1 R
7,768,160 B1 * 8/2010 Sahyoun ................ H02K 33/16
310/23
(Continued)

FOREIGN PATENT DOCUMENTS

CA　3136039　10/2020
CN　201766481　3/2011
(Continued)

OTHER PUBLICATIONS

"International Search Report (Form PCT/ISA/210) of PCT/CN2022/081133," mailed on May 26, 2022, with English translation thereof, pp. 1-6.

*Primary Examiner* — Maged M Almawri
(74) *Attorney, Agent, or Firm* — JCIPRNET

(57) ABSTRACT

A broadband vibration motor and an electronic device are provided. The broadband vibration motor comprises a case, a vibrator, a coil and a reset part. The case comprises an inner cavity; the vibrator is arranged in the inner cavity, and the outer peripheral surface of the vibrator is provided with lubricating regulating oil, and the vibrator is suspended in the inner cavity through the lubricating regulating oil; the coil is used to drive the vibrator to vibrate, and the coil is arranged around the outside of the vibrator; the reset part is
(Continued)

magnetic, and at least one reset part is correspondingly provided at both ends of the vibrator in the vibrating direction, and the reset part is disposed with the same pole opposite to the vibrator.

19 Claims, 18 Drawing Sheets

(51) Int. Cl.

| | |
|---|---|
| *C10M 129/68* | (2006.01) |
| *C10M 139/00* | (2006.01) |
| *C10M 169/04* | (2006.01) |
| *H02K 33/16* | (2006.01) |
| *H02K 33/18* | (2006.01) |
| *C10M 171/02* | (2006.01) |
| *C10N 10/04* | (2006.01) |
| *C10N 10/12* | (2006.01) |
| *C10N 40/14* | (2006.01) |

(52) U.S. Cl.
CPC ...... *C10M 139/00* (2013.01); *C10M 169/042* (2013.01); *H02K 33/18* (2013.01); *C10M 171/02* (2013.01); *C10M 2203/003* (2013.01); *C10M 2207/28* (2013.01); *C10M 2227/066* (2013.01); *C10N 2010/04* (2013.01); *C10N 2010/12* (2013.01); *C10N 2040/14* (2013.01); *H02K 2213/03* (2013.01)

(58) Field of Classification Search
CPC . H02K 5/167; H02K 2201/03; C10M 101/00; C10M 129/68; C10M 139/042; C10M 171/02; C10M 2203/003; C10M 2207/28; C10M 2227/066; C10N 2010/04; C10N 2010/12; C10N 2040/14
USPC ...................................................... 310/15–29
See application file for complete search history.

(56) References Cited

U.S. PATENT DOCUMENTS

| | | | | |
|---|---|---|---|---|
| 8,193,781 | B2 * | 6/2012 | Lin ........................ | H02K 35/02 |
| | | | | 336/200 |
| 9,231,461 | B2 * | 1/2016 | Kim ........................ | H02K 35/04 |
| 9,820,052 | B2 * | 11/2017 | Mao ........................ | H04R 9/025 |
| 10,160,010 | B2 * | 12/2018 | Chun .................... | H02K 33/16 |
| 10,418,890 | B2 * | 9/2019 | Kim ........................ | H02K 15/02 |
| 10,720,823 | B1 * | 7/2020 | Kim ........................ | H02K 1/02 |
| 11,641,152 | B2 * | 5/2023 | Cui ........................ | H02K 35/02 |
| | | | | 310/28 |
| 2007/0052302 | A1 * | 3/2007 | Cheung .................. | B82Y 25/00 |
| | | | | 310/12.25 |
| 2011/0057629 | A1 * | 3/2011 | Lin ........................ | H02K 35/02 |
| | | | | 322/3 |
| 2011/0140577 | A1 * | 6/2011 | Galchev ................ | H02K 35/02 |
| | | | | 310/22 |
| 2011/0169347 | A1 * | 7/2011 | Miyamoto ............. | G06F 3/016 |
| | | | | 310/12.21 |
| 2011/0198949 | A1 * | 8/2011 | Furuich .................. | H02K 33/16 |
| | | | | 310/25 |
| 2012/0086213 | A1 * | 4/2012 | Chan ...................... | H02K 7/088 |
| | | | | 310/90 |
| 2013/0010999 | A1 * | 1/2013 | Lastrucci ............... | H02K 33/16 |
| | | | | 381/400 |
| 2013/0057085 | A1 * | 3/2013 | Sugita ................ | H02K 41/0356 |
| | | | | 310/12.18 |
| 2015/0137628 | A1 * | 5/2015 | Endo ...................... | H02K 33/16 |
| | | | | 310/25 |
| 2017/0346351 | A1 * | 11/2017 | Volbers .................... | H02K 1/02 |
| 2018/0238411 | A1 * | 8/2018 | Sharkh .................. | H02K 33/06 |
| 2018/0358878 | A1 * | 12/2018 | Liu .......................... | H02K 1/34 |
| 2019/0356210 | A1 * | 11/2019 | Harrison ............... | H02K 33/00 |
| 2020/0012072 | A1 * | 1/2020 | Wang .................... | G06F 1/1686 |
| 2020/0251973 | A1 * | 8/2020 | Kim ........................ | H02K 3/02 |
| 2020/0366177 | A1 * | 11/2020 | Maeda .................. | H02K 33/02 |
| 2025/0020974 | A1 * | 1/2025 | Lee ........................ | H04N 23/00 |

FOREIGN PATENT DOCUMENTS

| | | |
|---|---|---|
| CN | 104646262 | 5/2015 |
| CN | 207204530 | 4/2018 |
| CN | 108028591 | 5/2018 |
| CN | 108566065 | 9/2018 |
| CN | 110233560 | 9/2019 |
| CN | 214069780 | 8/2021 |
| CN | 113726121 | 11/2021 |
| CN | 214850923 | 11/2021 |
| CN | 113904479 | 1/2022 |
| CN | 216312917 | 4/2022 |
| JP | 2000014116 | 1/2000 |
| JP | 2002239460 | 8/2002 |

* cited by examiner

A-A

BROADBAND VIBRATION MOTOR WITH CASE, VIBRATOR AND COIL, AND AT LEAST ONE RESET PART ARRANGED OPPOSITE THE VIBRATOR

CROSS-REFERENCE TO RELATED APPLICATION

This application is a 371 of international application of PCT application serial no. PCT/CN2022/081133, filed on Mar. 16, 2022, which claims the priority benefit of China application no. 202121238105.2, filed on Jun. 3, 2021, the priority benefit of China application no. 202110923066.8, filed on Aug. 12, 2021, the priority benefit of China application no. 202110891217.6, filed on Aug. 4, 2021, the priority benefit of China application no. 202111062238.3, filed on Sep. 10, 2021, and the priority benefit of China application no. 202111063975.5, filed on Sep. 10, 2021. The entirety of each of the above-mentioned patent applications is hereby incorporated by reference herein and made a part of this specification.

TECHNICAL FIELD

The application relates to the technical field of vibration motors, in particular to a broadband vibration motor and electronic device.

DESCRIPTION OF RELATED ART

Linear vibration motors are widely used in electronic products such as mobile phones, tablet computers, wearable devices, and navigators, which may generate feedback to users through the vibration of broadband vibration motors; for example, vibration feedback is generated when touching the screen of a mobile phone to dial a number, so that people may perceive it, thereby facilitating the use of electronic devices for people.

As far as the inventor knows, a linear vibrating motor generally comprises a case, and a vibrator, a coil and a reset flexure spring (or spring), etc. which are all arranged in the case. The vibrator is usually formed by connecting multiple magnets, and two adjacent magnets are connected through a magnetically conductive part. After the coil is energized, it can drive the vibrator to vibrate along the vibration axis, and the reset flexure spring are arranged at both ends of the case, and are respectively located on both sides of the vibration axis of the vibrator, the reset flexure spring is connected between the vibrator and the case, and may drive the vibrator to reset through the elastic force between it and the vibrator.

As far as the inventor knows, the linear vibration motor in the related art resets and provides damping through the reset flexure spring: firstly, the reset flexure spring has a fatigue limit, which limits the service life of the linear vibration motor; secondly, there is a risk of breaking the reset flexure spring, which reduces the reliability of the linear vibration motor; thirdly, during the vibration process, the vibrator collides with and rubs against the elastic part to easily generate noise.

In addition, the outer periphery of the vibrator of the linear vibration motor in the related art is often filled with ferrofluid to prevent the frictional contact between the vibrator and the case and transmit the vibration of the vibrator; however, the damping effect of the ferrofluid is unstable or the damping is too large, which will cause the vibration to be too small, and for electronic equipment users, the vibration motor cannot provide a reminder or the reminder is weak.

SUMMARY

The application provides a broadband vibration motor and an electronic device to overcome one or more defects in the related art.

In a first aspect, the application provides a broadband vibration motor, which comprises a case, a vibrator, a coil and a reset part. Wherein the case comprises an inner cavity. The vibrator is arranged in the inner cavity, and the outer peripheral surface of the vibrator is provided with lubricating regulating oil, and the vibrator is suspended in the inner cavity through the lubricating regulating oil. The coil is used to drive the vibrator to vibrate, and the coil is arranged around the outside of the vibrator. The reset part is magnetic, and at least one reset part is correspondingly arranged at both ends of the vibrator in the vibrating direction, and the reset part is disposed with the same pole opposite to the vibrator.

Further, the kinematic viscosity of the lubricating regulating oil at $-15°$ C. is $680\sim900$ mm$^2$/S, and the kinematic viscosity at $23°$ C. is $60\sim65.5$ mm$^2$/S, the kinematic viscosity at $40°$ C. is $30\sim35$ mm$^2$/S.

Further, the solid content of the lubricating regulating oil is 99-99.5 wt % after being placed at 100-110° C. for 3.5-4.5 hours.

Further, the raw materials for the preparation of the lubricating regulating oil comprise at least 90-99 parts of mineral oil in parts by weight.

Further, the mineral oil is a hydrocarbon, and the hydrocarbon is selected from one or more of linear hydrocarbons, branched hydrocarbons, substituted or unsubstituted cycloalkanes or aromatics.

Further, the lubricating regulating oil further comprises an organometallic compound, and the friction coefficient of the organometallic compound is 0.04-0.12.

Further, the organometallic compound is an organozinc compound and/or an organomolybdenum compound.

Further, the organomolybdenum compound is selected from one or more of molybdenum dialkyl dithiophosphate, nitrogen-containing molybdenum dialkyl dithiophosphate, dialkyl dithiophosphate molybdenum thiocarbamate, molybdenum amine complex, molybdenum naphthenate or molybdenum alkyl salicylate.

Further, the lubricating regulating oil further comprises organic acid esters, and the weight ratio between the organic acid esters and mineral oil is 1: (60~100); the viscosity of the organic acid esters at 100° C. is <1500 mm$^2$/S.

Further, the lubricating regulating oil is filled between the outer peripheral surface of the vibrator and the inner wall of the case; or The broadband vibration motor further comprises a guide sleeve relatively fixed to the case, the guide sleeve is provided with a guide hole, and the vibrator is slidably fitted in the guide hole, the lubricating regulating oil is filled between the vibrator and the guide sleeve.

Further, the coil is arranged in the inner cavity or wound outside the case.

Further, the case further comprises end covers sealing both ends of the inner cavity, and the reset part is connected to the end cover.

Further, the vibrator is a single part, which comprises at least two magnet parts and a non-magnetic part between two adjacent magnet parts; the magnetic poles of the magnet part and the non-magnetic part are arranged along the vibration axis of the vibrator, and the two magnetic poles of two adjacent magnet parts have the same polarity, and the reset part is arranged with the same pole opposite to the magnet part at the end of the vibrator.

Further, the coil is arranged around the outer circumference of the non-magnetic part, and the thickness of the coil is greater than or equal to the thickness of the non-magnetic part.

Further, the outer peripheral surface of the vibrator is provided with a groove;

The groove is annular and arranged around the outer peripheral surface of the vibrator;

Or the groove is strip-shaped, the outer peripheral surface of the vibrator comprises a plurality of side surfaces, at least one of the side surfaces is provided with the groove.

Further, the vibrator comprises at least two magnetic parts and a magnetically conductive part connected between the two adjacent magnetic parts, the range where the coil surrounds the vibrator comprises the magnetically conductive part; the reset part is set with the same pole opposite to the magnetic part at the end of the vibrator.

Further, the vibrator further comprises a fixed piece, and the fixed piece is fixedly connected to the surface of the magnetic part.

Further, the thickness of the fixed piece is 0.01-0.3 mm; the material of the fixed piece is non-magnetic stainless steel material, non-magnetic alloy materials or non-magnetic polymer materials.

Further, the reset part is provided with a central opening or the reset part is solid, and the size of the end surface of the reset part is greater than or equal to the size of the end surface of the magnetic part located at the end of the vibrator.

In another aspect, the present application further proposes an electronic device, comprising the broadband vibration motor according to any one of the above embodiments.

DESCRIPTION OF THE EMBODIMENTS

In order to make the above objectives, features, and advantages of the present application more obvious and understandable, the specific embodiments of the present application will be described in detail below with reference to the drawings. It may be understood that the specific embodiments described herein are only used to explain the application, but not to limit the application. In addition, it should be noted that, for ease of description, the drawings only show parts of the structures related to the present application, but not all of the structures. Based on the embodiments in this application, all other embodiments obtained by those of ordinary skill in the art without inventive work shall fall within the protection scope of this application.

The terms "including" and "having" and any variations of them in this application are intended to cover non-exclusive inclusions. For example, a process, method, system, product, or device that includes a series of steps or units is not limited to the listed steps or units, but optionally includes unlisted steps or units, or optionally also includes other steps or units inherent in these processes, methods, products or devices.

Reference to "embodiments" herein means that a specific feature, structure, or characteristic described in conjunction with the embodiments may be included in at least one embodiment of the present application. The appearance of the phrase in various places in the specification does not necessarily refer to the same embodiment, nor is it an independent or alternative embodiment mutually exclusive with other embodiments. Those skilled in the art clearly and implicitly understand that the embodiments described herein may be combined with other embodiments.

Figure 1:
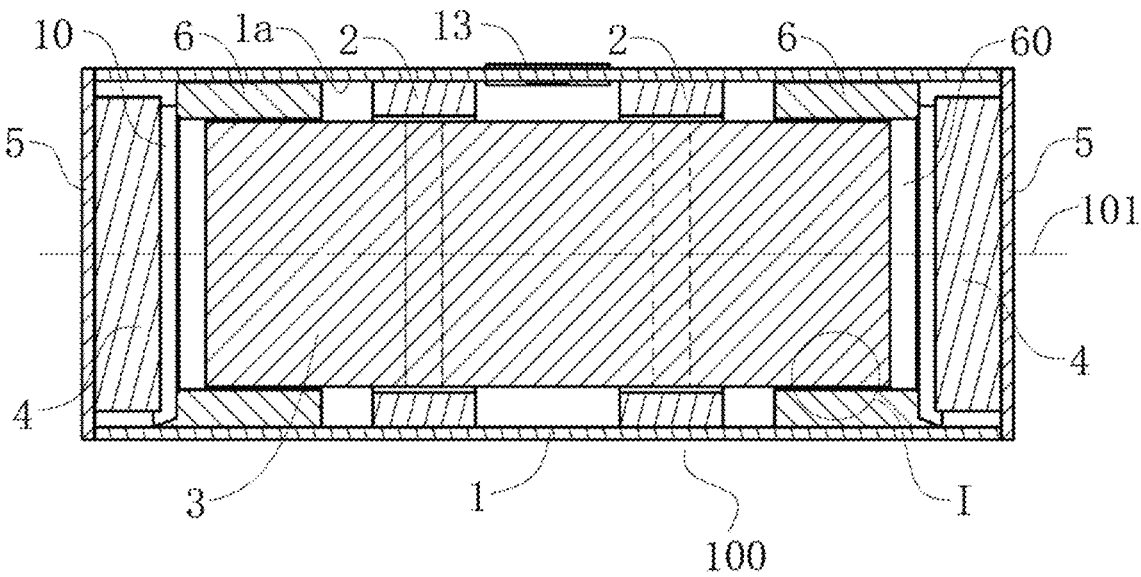
FIG. 1 is a cross-sectional view of a broadband vibration motor according to an embodiment of the present application.

As shown in FIG. 1, a broadband vibration motor corresponding to a preferred embodiment of the present application comprises a case 100, a coil 2 fixed to the case 100, a vibrator 3 that is movably fitted in the case 100, a reset part 4 for driving vibrator 3 to reset, and the lubricating regulating oil 9 arranged on the outer periphery of the vibrator 3.

The case 100 comprises a housing 1, the housing 1 is tubular, and has an inner cavity 10, the outer contour shape of the housing 1 is not limited, such as a circle or a rectangle, and the cross-sectional shape of the inner cavity 10 formed by it is also not limited, for example, the housing 1 whose outer contour is rectangular has a circular inner chamber 10; preferably, the cross-sectional shape of the inner cavity 10 is consistent with the outer contour shape of the housing 1. The housing 1 may be a part formed integrally, or may be formed by connecting multiple parts. For example, in some embodiments, referring to FIG. 2, the housing 1 is in the shape of a square tube, which has an inner cavity 10, and the cross section of the inner cavity 10 is rectangular. The housing 1 is connected by a plurality of parts, and specifically, the housing 1 comprises a frame body 11 and a cover plate 12, the frame body 11 is roughly U-shaped and has an open end, and the cover plate 12 is connected to the open end and sealing the open end, so that the frame body 11 and the cover plate 12 are connected as a whole (that is, the housing 1) to be in the shape of a square tube.

The case 100 further comprises end caps 5 connected to both ends of the housing 1, the end caps 5 are used to seal the two ends of the inner cavity 10, so that the inner cavity 10 of the housing 1 is in a closed state, preventing external foreign matter from entering the inner cavity 10, which is more advantageous for the reliable operation of the broadband vibration motor.

Figure 3:
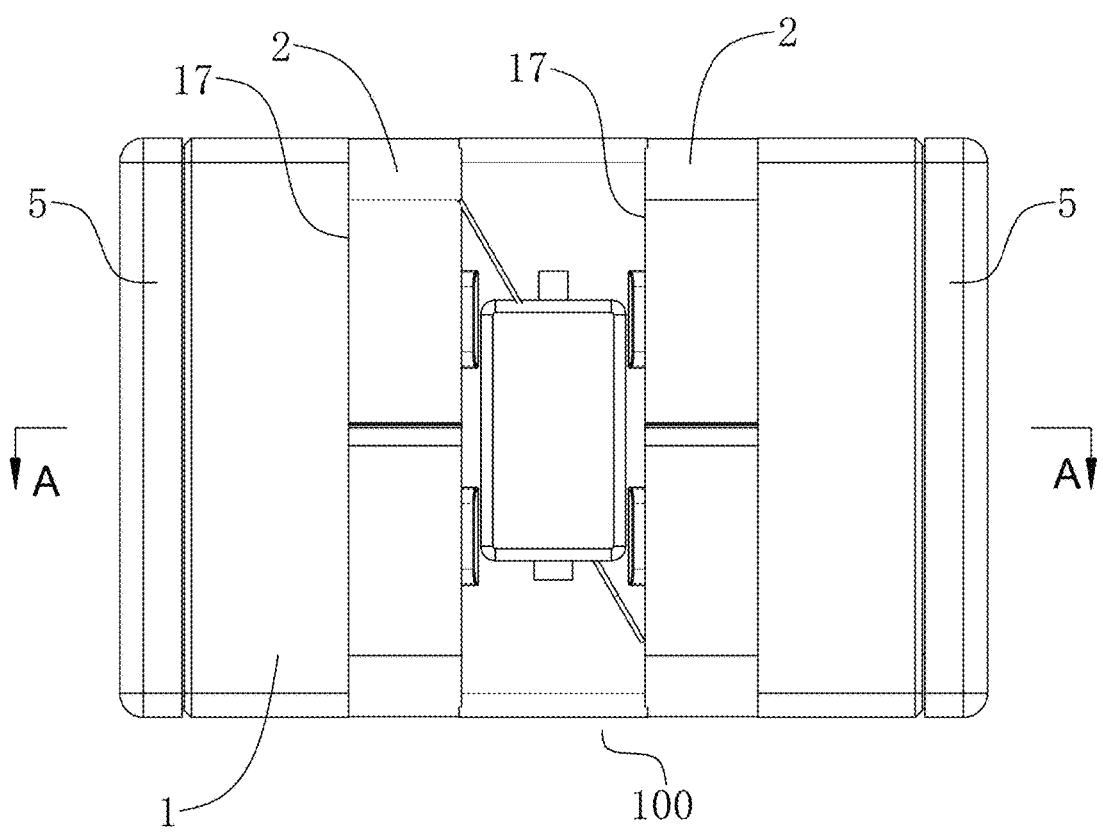
FIG. 3 is a top view of a broadband vibration motor according to an embodiment of the present application.

The coil 2 is fixedly connected to the housing 1, and the connection method is not limited, for example, through adhesive connection, bolt connection, or directly winding outside the housing 1. The coil 2 is connected to an external control circuit board, and the control circuit board may control one or more of the parameters such as the magnitude, direction and frequency of the current and voltage passed into the coil 2, thereby controlling the magnitude and direction of the magnetic field generated by the coil 2. The vibrator 3 is installed in the coil 2, and may vibrate back and forth along the vibration axis 101 after receiving the force of the magnetic field generated by the coil 2. The coil 2 may be installed inside the housing 1 or outside the housing 1 as long as the magnetic force generated by it may drive the vibrator 3 to vibrate. In some embodiments, referring to FIG. 1, the coil 2 is fixedly connected inside the housing 1, specifically, the coil 2 is fixedly connected to the inner wall 1a of the housing 1. In other embodiments, referring to FIG. 3 and FIG. 4, the coil 2 is fixedly connected to the outside of the housing 1, and an annular coil installation groove 17 is opened on the outer surface 1b of the housing 1, and the coil 2 is installed in the coil installation groove 17.

Figure 2:
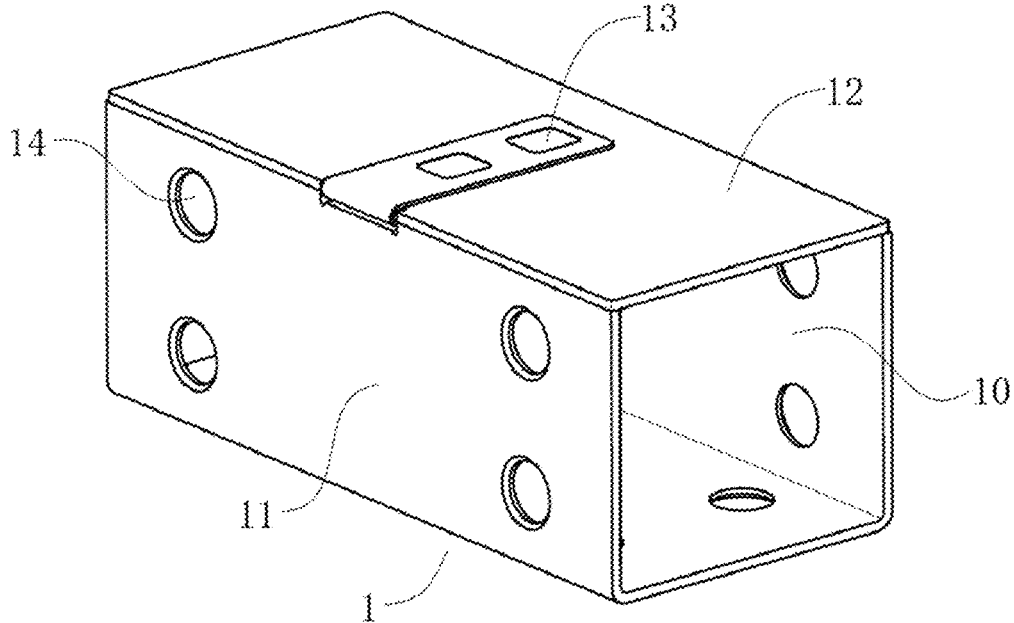
FIG. 2 is a perspective schematic diagram of a case in an embodiment of the present application.

Referring to FIG. 1 and FIG. 2, the broadband vibration motor further comprises a flexible circuit board 13 connected to the cover plate 12, one end of the flexible circuit board 13 is electrically connected to the lead wire of the coil 2, and the other end extends outward so as to be connected to an external control circuit board. In the embodiment shown in FIG. 1, there are two coils 2, which are arranged on both sides of the flexible circuit board 13 respectively.

The vibrator 3 is movably fitted in the housing 1, and it may vibrate back and forth along the vibration axis 101. Preferably, the axis of the casing 1 coincides with the vibration axis 101, and further preferably, the first axis 16 of the vibrator 3 also coincides with the vibration axis 101 (referring to FIG. 5 and FIG. 9). The reset part 4 is used to drive the vibrator 3 to reset, and there are at least two of them, and they are respectively located at two ends of the vibrator 3 in the direction of the vibration axis 101. The reset part 4 has magnetism, such as a magnet, and generates a force driving the vibrator 3 to reset through magnetic force. Since the reset parts 4 are provided on both sides of the moving direction of the vibrator 3, the reset parts 4 on both sides may exert a certain force on the vibrator 3, so that the vibrator 3 automatically returns to its original position, and obviously, the original position is the position when the vibrator 3 is in force balance. After receiving the driving force of the coil 2, the vibrator 3 may respond more sensitively and quickly, and after losing the driving force, it returns to its original position under the reset force of the reset part 4.

Figure 5:
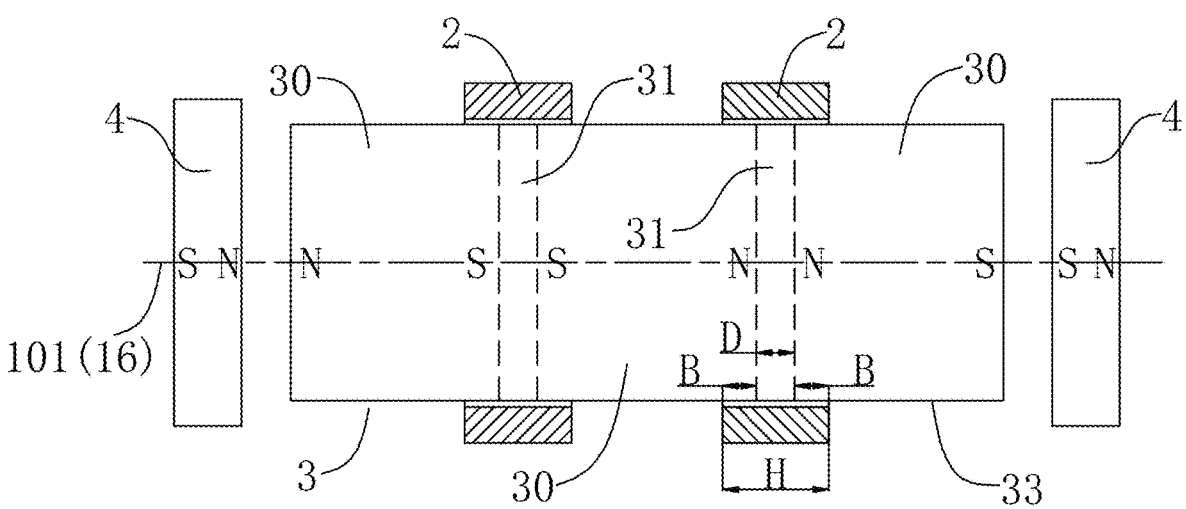
FIG. 5 is a schematic diagram of the polarity of a vibrator and a reset part according to an embodiment of the present application.

In some embodiments, the reset part 4 is a magnet, and at least one reset part 4 is correspondingly provided at both ends of the vibration direction of the vibrator 3. Preferably, the reset part 4 is connected to the end caps 5, and each end cap 5 is provided with a reset part 4. Referring to FIG. 5, the end of the vibrator 3 and the corresponding reset part 4 are arranged with the same pole opposed to each other, and the reset parts 4 on the two end caps 5 drive the vibrator 3 to reset by magnetic force.

Figure 6:
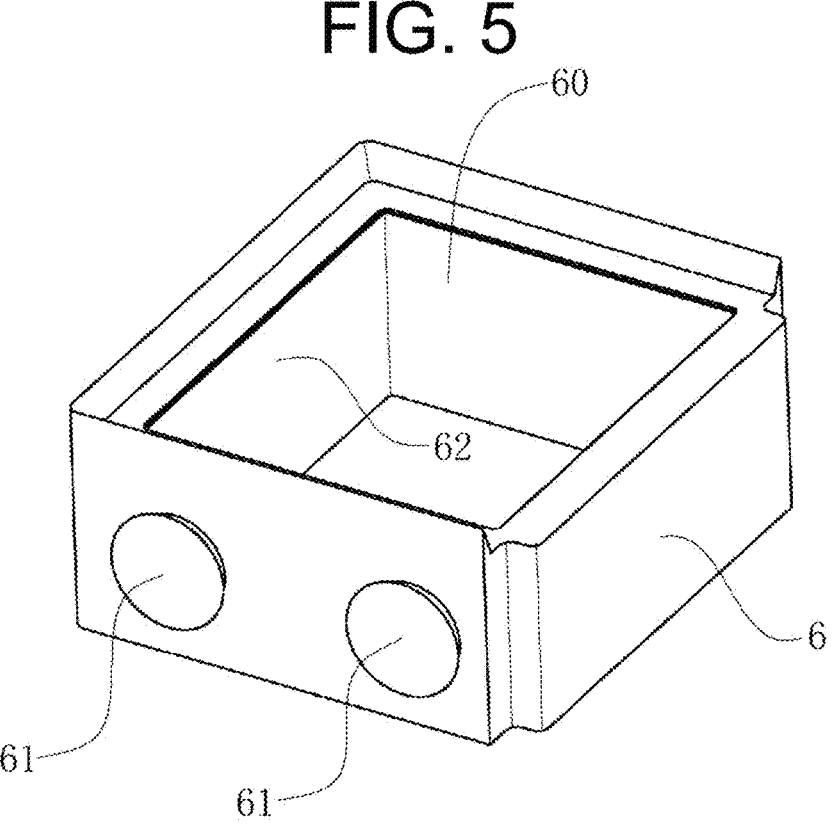
FIG. 6 is a schematic structural view of a guide sleeve according to an embodiment of the present application.

As shown in FIG. 1 and FIG. 6, in order to enable the vibrator 3 to vibrate along the vibration axis 101 with higher precision, the broadband vibration motor further comprises a guide sleeve 6 surrounding outside the vibrator 3, and the guide sleeve 6 is relatively fixed to the housing 1, and its number is not limited to one. The vibrator 3 is slidingly fitted in the guide hole 60 of the guide sleeve 6, and obviously, by improving the dimensional accuracy of the guide hole 60, the matching accuracy with the vibrator 3 may be improved, so that the vibrator 3 may be better guided to vibrate. The guide sleeve 6 may be an independent part connected with the housing 1, or a part of the housing 1 protruding into the inner cavity 10.

In some embodiments, the guide sleeve 6 is a discrete part, which is arranged in the inner cavity 10 and fixedly connected to the inner wall 1a of the housing 1. The number of guide sleeves 6 is two, which are respectively surrounding on the two ends of the vibrator 3. Of course, in other embodiments, the number of guide sleeves 6 may also be three or more. In order to improve the position accuracy of the guide sleeve 6, as shown in FIG. 2 and FIG. 6, the guide sleeve 6 is provided with an outwardly protruding positioning boss 61, and the housing 1 is provided with a positioning hole 14 adapted to the positioning boss 61, and through the cooperation of the positioning hole 14 and the positioning boss 61, the position accuracy of the guide sleeve 6 in the housing 1 may be improved, and the connection strength between the guide sleeve 6 and the housing 1 may be improved, which may prevent the guide sleeve 6 from loosening and shifting during the vibration process of the vibrator 1, thereby ensuring the reliable operation of the broadband vibration motor. In addition, the arrangement of the guide sleeve 6 may also isolate the part where the vibrator 3 may generate friction from the case 100, and therefore, it is allowed to use metal for the case 100, and the thickness may be reduced under the premise of ensuring the structural strength, so as to reduce the structural volume of the broadband vibration motor and reduce the required volume in application scenarios.

Figure 7:
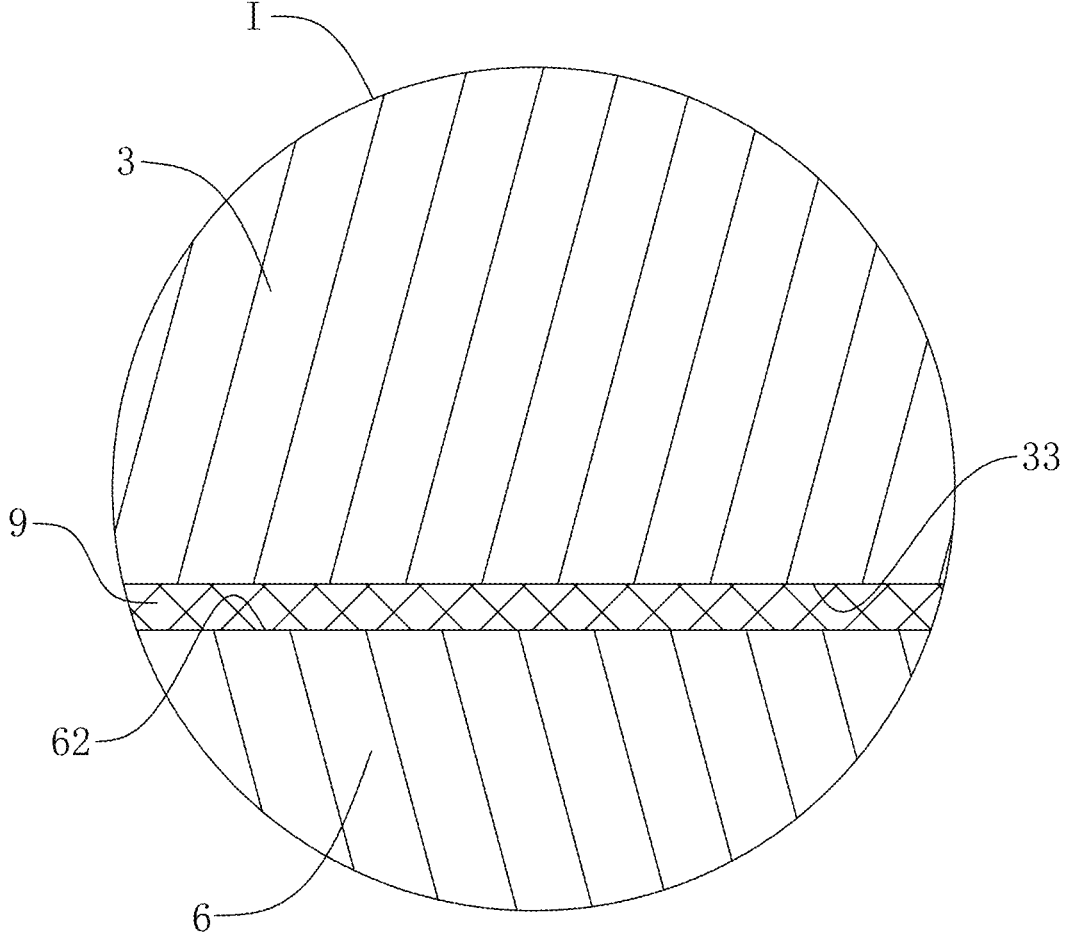
FIG. 7 is an enlarged view of part I in FIG. 1.

Referring to FIG. 1 and FIG. 7, the lubricating regulating oil 9 is filled between the outer peripheral surface 33 of the vibrator 3 and the inner surface 62 of the guide sleeve 6, so that the vibrator 3 moves in the thin film formed by the lubricating regulating oil 9, thereby adjusting the damping received during its operation, reducing the heating and noise caused by friction, and improving the vibration effect. When the broadband vibration motor is installed on mobile phones, game controllers and other products, it may have a better user experience. In some embodiments, the lubricating regulating oil 9 is provided on the outer peripheral surface 33 of the vibrator 3 and/or the inner surface 62 of the guide sleeve 6 by means of spraying or smearing. The lubricating regulating oil 9 is preferably mixed lubricating regulating oil 9, and the damping experienced by the vibrator 3 may be adjusted by changing the type and composition of the lubricating regulating oil 9 filled.

Figure 4:
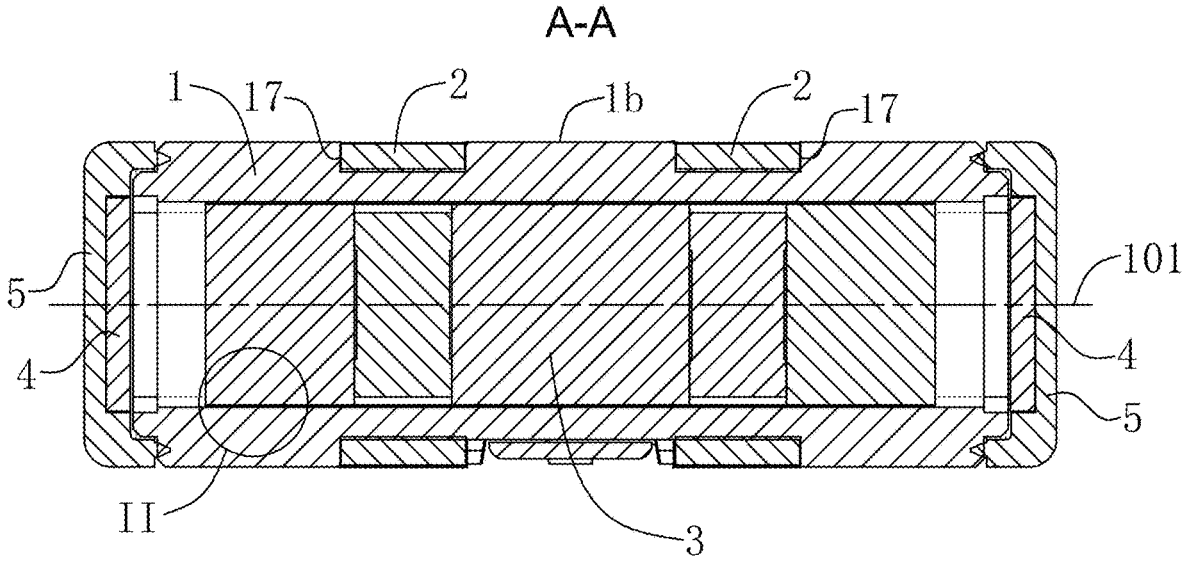
FIG. 4 is a cross-sectional view of the broadband vibration motor shown in FIG. 3 along A-A.
Figure 8:
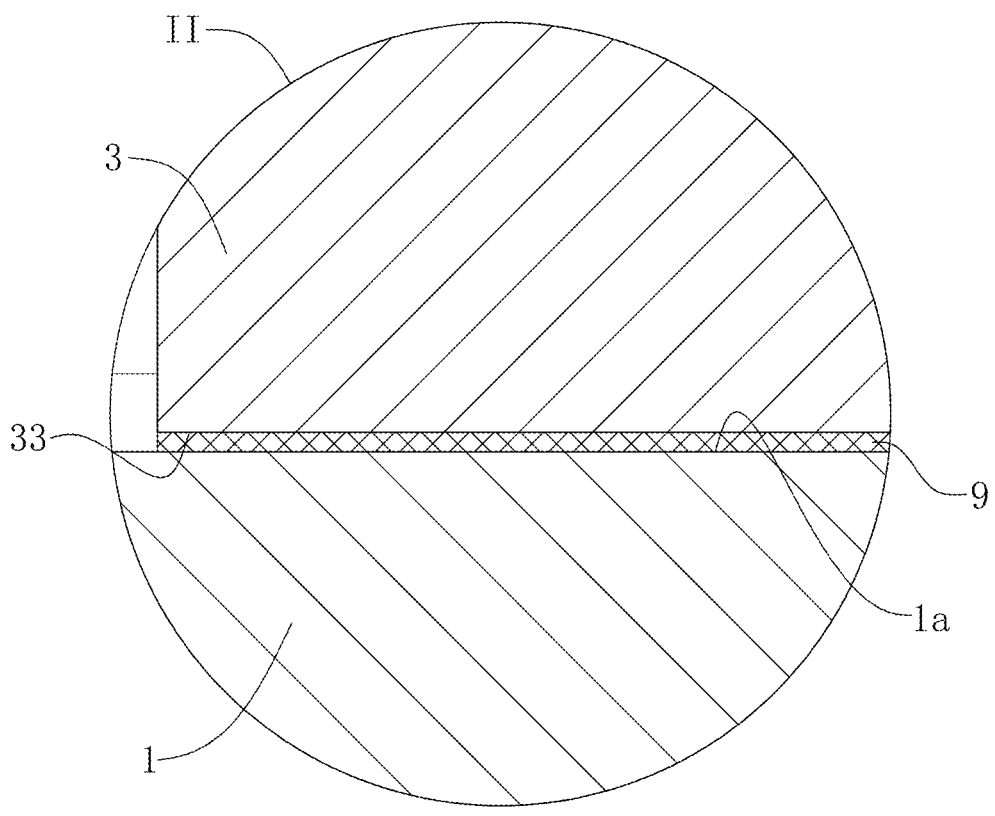
FIG. 8 is an enlarged view of part II in FIG. 4.

It may be understood that, in the embodiment without the guide sleeve 6, such as the embodiment shown in FIG. 4 and FIG. 8, the lubricating regulating oil 9 is filled between the outer peripheral surface 33 of the vibrator 3 and the inner wall 1a of the housing 1.

In some embodiments, the kinematic viscosity of the lubrication regulating oil 9 at −15° C. is 680-900 mm2/S, the kinematic viscosity at 23° C. is 60-65.5 mm²/S, and the kinematic viscosity at 40° C. is 30-35 mm²/S.

As far as the inventor knows, with the development of the electronics industry, vibration motors are developing rapidly; however, current motors use springs or metal flexure spring structures to exert vibration effects, but these two methods have unstable vibration effects and poor reliability, what's more, it produces noise and affects the use value; the inventor unexpectedly found that using the lubricating regulating oil 9 as the vibration conduction medium of the vibrator 3 may improve the lubricating damping performance, and the lubricating damping effect is stable, no noise, strong reliability, especially when the lubricating regulating oil 9 meets the kinematic viscosity of 680~900 mm²/S at −15° C. 60~65.5 mm²/S at 23° C., and 30~35 mm²/S at 40° C., it has excellent lubricating and damping effect, and the inventor deems that the possible reason is that the interaction force between the lubricating regulating oil 9 and the inner wall under this condition when sliding is in a stable state; during the movement of the vibrator 3, under the effect of the lubricating regulating oil 9 under this condition, there is no abrupt force generation, so that the lubricating damping effect is stable.

In some embodiments, the solid content of the lubricating regulating oil 9 is 99-99.5 wt % after being placed at 100-110° C. for 3.5-4.5 hours.

In some embodiments, the solid content of the lubrication regulating oil 9 is 99-99.5 wt % after being placed at 105° C. for 4 hours.

As far as the inventor knows, when the reset part 4 is a spring and the spring is used to achieve the damping effect, the spring may break after a period of use, reducing the service life of the motor; especially when it is used in a high temperature environment (for example, over 35° C.) for a long time, the service life will decrease rapidly; after the inventor has applied the lubricating regulating oil 9 to the motor to increase the service life of the motor through a series of research, thinking, and improvement, it has been unexpectedly found that when the lubricating regulating oil 9 was treated at 105° C. for 4 hours, the solid content was 99~99.5 wt %, and at this time, after the motor has been running for a period of time, the damping effect remains stable after the Acceleration Reliability Test (ALT) simulation for up to 2 years; the inventor deems that the possible reason is that as the motor continues to be used, especially when it is used at a temperature higher than 35° C., after a period of time, the internal temperature of the motor continues to rise; while the temperature continues to rise, the viscosity of the lubricating regulating oil 9 changes within a certain range at this time, which affects the lubricating and damping effect; under the condition of this solid content, at this time, on the basis of the moving damping force, a certain amount of mass damping is added, so that the effect of stable damping may be achieved under changing temperature conditions.

In some embodiments, the raw materials for the preparation of the lubricating regulating oil 9 comprise at least 90-99 parts by weight of mineral oil.

In some embodiments, the raw materials for the preparation of the lubricating regulating oil 9 comprise at least 96.5-97.5 parts of mineral oil in parts by weight.

Preferably, the mineral oil is a hydrocarbon, and the hydrocarbon is selected from one or more of linear hydrocarbons, branched hydrocarbons, substituted or unsubstituted cycloalkanes or aromatics.

In some embodiments, the linear hydrocarbons include, but are not limited to at least one of n-pentane, n-hexane, n-heptane, n-octane, n-nonane, decane, undecane, dodecane, and tridecane.

In some embodiments, the branched hydrocarbons include, but are not limited to at least one of isopentane, 2-methylpentane, 3-methylpentane, 2,3-dimethylbutane, 2,2-dimethylbutane, 2,2-dimethylpentane, 2,3-dimethylpentane, 3-methylhexane, 2,4-dimethylpentane, 3,3-dimethylpentane alkanes, 2,2,3-trimethylbutane, 2-methylhexane and 3-ethylpentane.

In some embodiments, the cycloalkanes include, but are not limited to at least one of cyclopentane, cyclohexane, cycloheptane, and cyclooctane.

In some embodiments, the aromatics include, but are not limited to at least one of benzene, toluene, o-xylene, m-xylene, p-xylene, ethylbenzene, n-propylbenzene, cumene, and styrene.

In some embodiments, the lubricating regulating oil 9 further comprises an organometallic compound, and the friction coefficient of the organometallic compound is 0.04-0.12.

The friction coefficient described in this technical solution is obtained by testing with reference to the test method of SH/T0190-1992.

Preferably, the organometallic compound is an organozinc compound and/or an organomolybdenum compound.

In some embodiments, the organozinc compound is zinc dialkyl dithiophosphate.

In some embodiments, the organomolybdenum compound is one or more of molybdenum dialkyl dithiophosphate, nitrogen-containing molybdenum dialkyl dithiophosphate, dialkyl dithiophosphate molybdenum thiocarbamate, molybdenum amine complex, molybdenum naphthenate or molybdenum alkyl salicylate.

In some embodiments, the lubricating regulating oil further comprises organic acid esters, and the weight ratio between the organic acid esters and mineral oil is 1:(60~100).

In some embodiments, the lubricating regulating oil further comprises organic acid esters, and the weight ratio between the organic acid esters and mineral oil is 1: (64.3~97.5).

In some embodiments, the viscosity of the organic acid esters at 100° C. is less than 1500 mm²/S.

In some embodiments, the organic acid esters have a viscosity of 300-400 mm2/S at 100° C.

The kinematic viscosity in this technical solution is obtained with reference to GB/T265 test.

In some embodiments, the organic acid esters are fumarate and/or polymethacrylate.

In some embodiments, the organic acid esters are polymethacrylates.

The inventors found that when the lubricating regulating oil 9 is used in the motor at a temperature lower than 5° C., the lubricating and damping effect is poor; the use of conventional organic acid esters in the lubrication regulating oil 9 of this application cannot effectively improve the anti-skid damping effect at temperatures below 5° C.; the inventor has unexpectedly found that when the kinematic viscosity of organic acid esters at 100° C. is less than 1500 mm²/S, especially 300~400 mm²/S, the lubricating and damping effect of the lubrication regulating oil 9 is still good when used in motors, even in an environment below 5° C.; the inventor deems that the possible reason is that in a low temperature environment, the organic acid esters under this condition may fully and uniformly act on the lubricating regulating oil 9, uniformly precipitate in the lubricating regulating oil 9 system, and develop as wax crystals center, preventing the appearance of large network wax crystals, or improving the flow properties of hydrocarbons; however, if the kinematic viscosity is lower or higher than this range, organic acid esters cannot be fully integrated in the lubricating regulating oil 9 under low temperature conditions, and there will be wax crystal defect spaces in the network paste frame, thereby reducing the lubricating damping effect. The inventor has unexpectedly found that if it is applied in the motor under the condition that the viscosity and solid content of the lubricating regulating oil 9 are within a specific range and the organic acid esters are also kept within a certain viscosity range and maintain a specific weight ratio to hydrocarbons, the driving force is strong and the vibration is kept high; the inventor deems that the possible reason is that under a certain range of viscosity and solid content, the degree of frictional decomposition of the organic molecular phase in the lubricating regulating oil 9 is reduced; at this time, the movement resistance of the vibrator 3 is appropriate to provide a relatively large driving force.

In some embodiments, the lubricating regulating oil 9 further comprises a rust inhibitor.

In some embodiments, the rust inhibitor includes, but is not limited to at least one of calcium petroleum sulfonate, barium trinonylnaphthalene sulfonate, barium heavy alkylbenzene sulfonate, and barium petroleum sulfonate.

In some embodiments, the lubricating regulating oil 9 further comprises an antioxidant.

In some embodiments, the antioxidants include, but are not limited to at least one of alkyldiphenylamines, ethylenediaminetetraacetic acid tetrabenzylamides, 2,4-diaminodiphenyl ethers, 1-(alkylbenzyl)-3-phenylurea and 2,6-di-tert-butyl-p-cresol.

The preparation method of the lubricating regulating oil 9 of the present application is: mixing one or more of mineral oil, calcium petroleum sulfonate, organic metal compounds, alkyldiphenylamines and organic acid esters, or mixing two or more commercially available products to achieve the required performance, for example, the kinematic viscosity of lubricating conditioner oil 9 at −15° C. is 680-900 mm2/S, at 23° C. is 60-65.5 mm2/S, and at 40° C. is 30-35 mm2/S. Another example is to make the lubricating regulating oil 9 stand at 100-110° C. for 3.5-4.5 hours, and then the solid content is 99-99.5 wt %.

In addition, all raw materials used are commercially available unless otherwise stated.

In some embodiments, the vibrator 3 is a single part formed integrally, and in other embodiments, the vibrator 3 is formed by connecting multiple parts.

In some embodiments, the vibrator 3 is a single part formed integrally, and the vibrator 3 comprises at least two magnet parts 30 and a non-magnetic part 31 between two adjacent magnet parts 30. The directions of the forces exerted by the two reset parts 4 on the ends of the vibrator 3 adjacent to them are opposite, so that the vibrator 3 will not be biased to one side. For example, in the embodiment shown in FIG. 1 and FIG. 5, the vibrator 3 comprises three magnet parts 30 and two non-magnetic parts 31; the boundary line between the magnet part 30 and the non-magnetic part 31 is shown with a dotted line in the FIGure; the two adjacent magnetic poles of the reset part 4 on the left and the vibrator 3 are both N poles, and the two adjacent magnetic poles of the reset part 4 on the right and the vibrator 3 are both S poles; both reset parts 4 exert a repulsive force on the vibrator 3 to drive the vibrator 3 to reset. The resetting of the vibrator 3 is driven by the magnetic force of the magnet, which may effectively avoid defects such as performance degradation or fatigue fracture of the elastic part due to long-term use.

Figure 9:
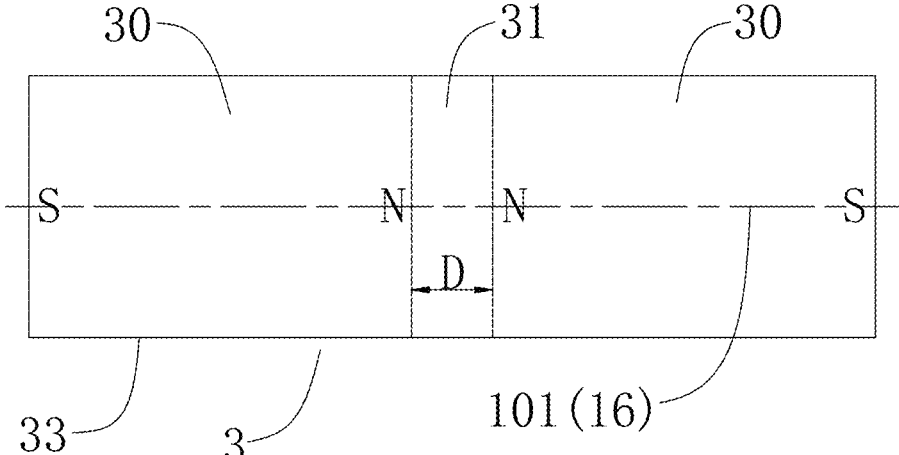
FIG. 9 is a schematic structural diagram of a vibrator according to an embodiment of the present application.

Preferably, the above-mentioned vibrator 3 is integrally magnetized and formed by magnetic materials such as ferrite, neodymium iron boron, alnico and samarium cobalt. As shown in FIG. 5 and FIG. 9, the vibrator 3 comprises at least two magnet parts 30 and a non-magnetic part 31 between two adjacent magnet parts 30. It may be understood that the magnet part 30 and the non-magnetic part 31 are part of the vibrator 3 rather than separate components. Each magnet part 30 comprises two magnetic poles, which are N pole and S pole respectively, and the polarities of the two adjacent magnetic poles adjacent to two adjacent magnet parts 30 are the same, the magnetic field lines may be concentrated and approximately pass through the coil 2 vertically; after the coil 2 is energized, a greater driving force may be generated, and the driving force and sensitivity of the broadband vibration motor may be improved. A plurality of magnet parts 30 are arranged along the vibration axis 101 of the vibrator 3, and the non-magnetic part 31 separates two adjacent magnet parts 30, that is to say, the magnetic poles of the magnet part 30 and the non-magnetic part 31 are arranged along the vibration axis 101 of the vibrator 3.

In some embodiments, as shown in FIG. 5, the position of the coil 2 corresponds to the non-magnetic part 31, that is, the coil 2 is arranged around the outer periphery of the non-magnetic part 31. The thickness H of the coil 2 may be the same as the thickness D of the non-magnetic portion 31 or may be greater than the thickness D of the non-magnetic portion 31. Preferably, the thickness H of the coil 2 is greater than the thickness D of the non-magnetic part 31, so that the magnetic field lines derived from the non-magnetic part 31 may pass through the coil 2 as much as possible, and the maximum possible Lorentz force is generated for driving, so that the vibrator 3 is more responsive. In some embodiments, the coil 2 is symmetrically arranged on the non-magnetic part 31, and the area width B of the two magnet parts 30 covered by it is the same, so as to make the symmetry better.

Referring to FIG. 9, the vibrator 3 shown in FIG. 9 comprises one non-magnetic part 31 and two magnet parts 30, of course, the number is not limited thereto, for example, as shown in FIG. 5, it has two non-magnetic parts 31 and three magnet parts 30, for the situation that there are more non-magnetic parts 31, it may be deduced by analogy. For the case where there are multiple non-magnetic parts 31, the thicknesses of the multiple non-magnetic parts 31 may be the same or different. In some embodiments, the thickness of the non-magnetic part 31 is more than 0.3 mm, and its maximum value is smaller than the minimum value of any one of the thicknesses of the magnet part 30; if the thickness of the non-magnetic part 31 is too small, the boundary between the magnet part 30 and the non-magnetic part 31 will be unclear, which will affect the performance of the vibrator 3; and if it is too large, the magnet part 30 will be correspondingly smaller, which affects the magnetic flux and the B value.

Figure 10:
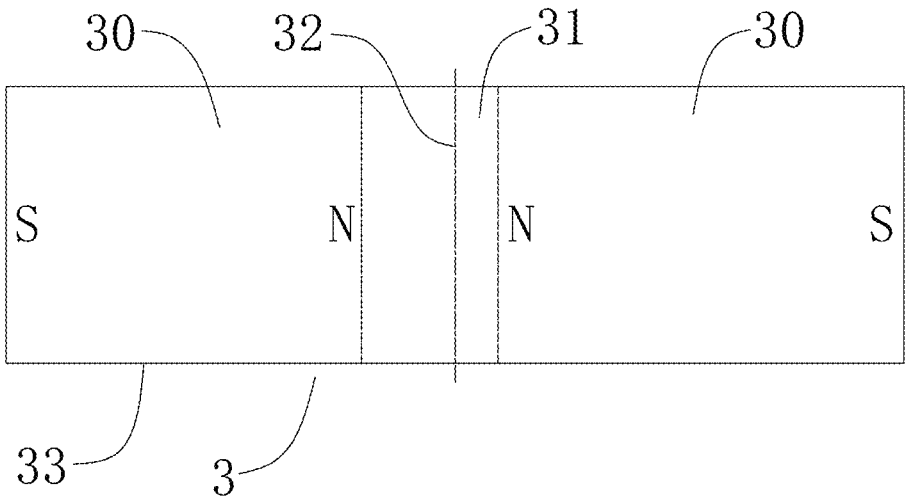
FIG. 10 is a schematic structural diagram of a vibrator according to an embodiment of the present application.

The cross-sectional shape of the vibrator 3 is not limited, for example, the cross-sectional shape is triangular, circular or rectangular; preferably, the shape of the guide hole 60 of the guide sleeve 6 is consistent with the outer contour of the vibrator 3 to ensure guiding accuracy. The magnet part 30 and the non-magnetic part 31 formed on the vibrator 3 may be symmetrical or asymmetrical with respect to the geometric symmetry plane 32 of the vibrator 3, and FIG. 10 shows an asymmetrical situation.

Figure 11:
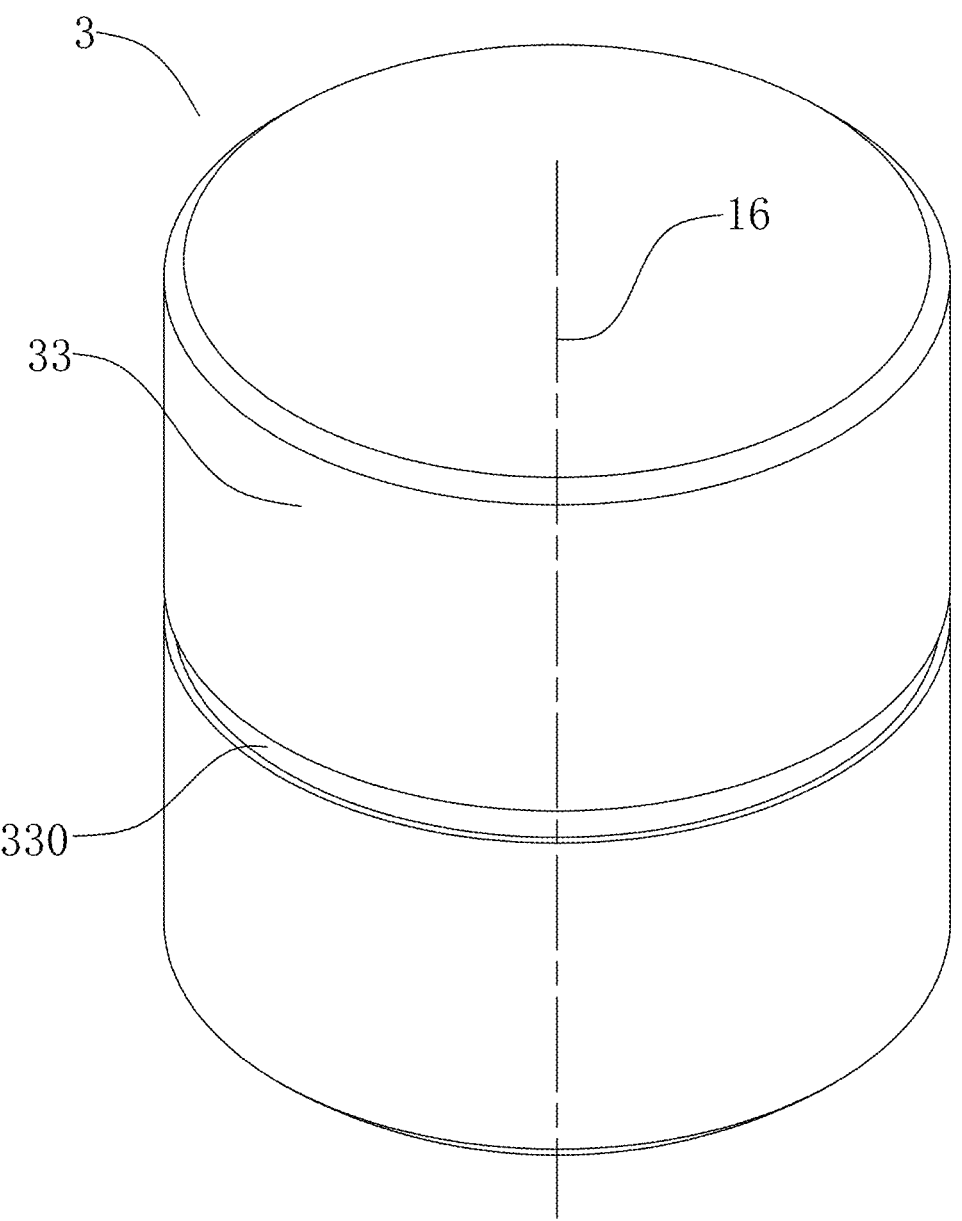
FIG. 11 is a perspective view of a vibrator according to an embodiment of the present application, in which the vibrator is cylindrical.
Figure 12:
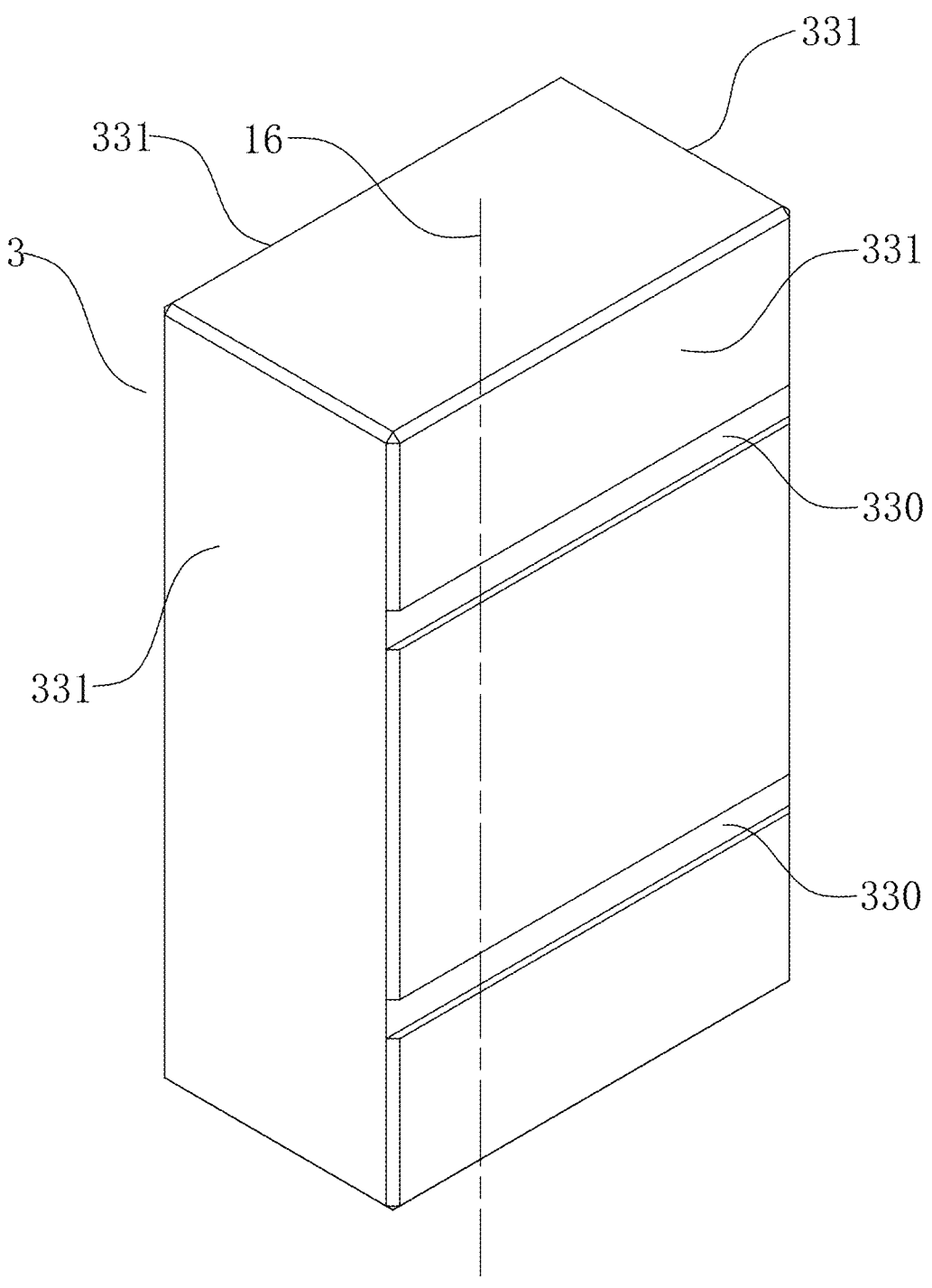
FIG. 12 is a perspective view of a vibrator according to an embodiment of the present application, in which the vibrator is in the shape of a cuboid.
Figure 13:
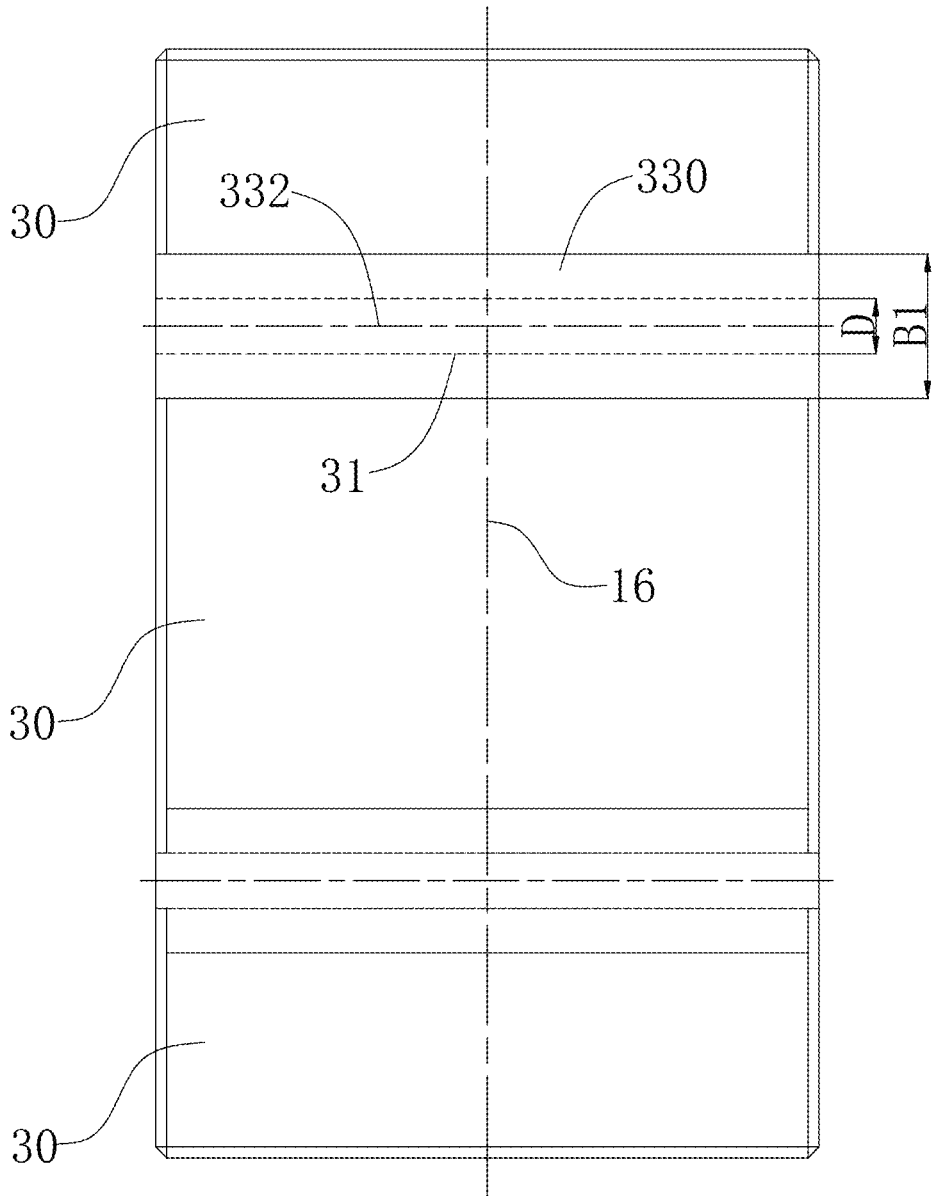
FIG. 13 is a front view of a vibrator according to an embodiment of the present application.

In some embodiments, the outer peripheral surface 33 of the vibrator 3 is provided with a groove 330. For the outer peripheral surface 33 of the vibrator 3 with a circular cross-section (that is, cylindrical), referring to FIG. 11, its groove 330 is set as an annular groove surrounding the outer peripheral surface 33 of the vibrator 3, and the axis of the annular groove coincides with the first axis 16 of the vibrator 3; for the outer peripheral surface 33 of the vibrator 3 with a polygonal cross-section (for example, a polygonal column-shaped vibrator 3), as shown in FIG. 12 and FIG. 13, the outer peripheral surface 33 includes a plurality of side surfaces 331 connected end to end; at this time, the groove 330 is in the shape of a strip, which may be arranged on one or more side surfaces 331; preferably, the centerline 332 of the groove 330 is perpendicular to the first axis 16 of the vibrator 3, and its two ends extend to two side surfaces 331 adjacent to the side surface 331 where it is located. When all the side surfaces 331 are provided with the grooves 330 and the heights of the grooves 330 are the same, the multiple grooves 330 form an annular groove surrounding the outer peripheral surface 33 of the vibrator 3.

Figure 14:
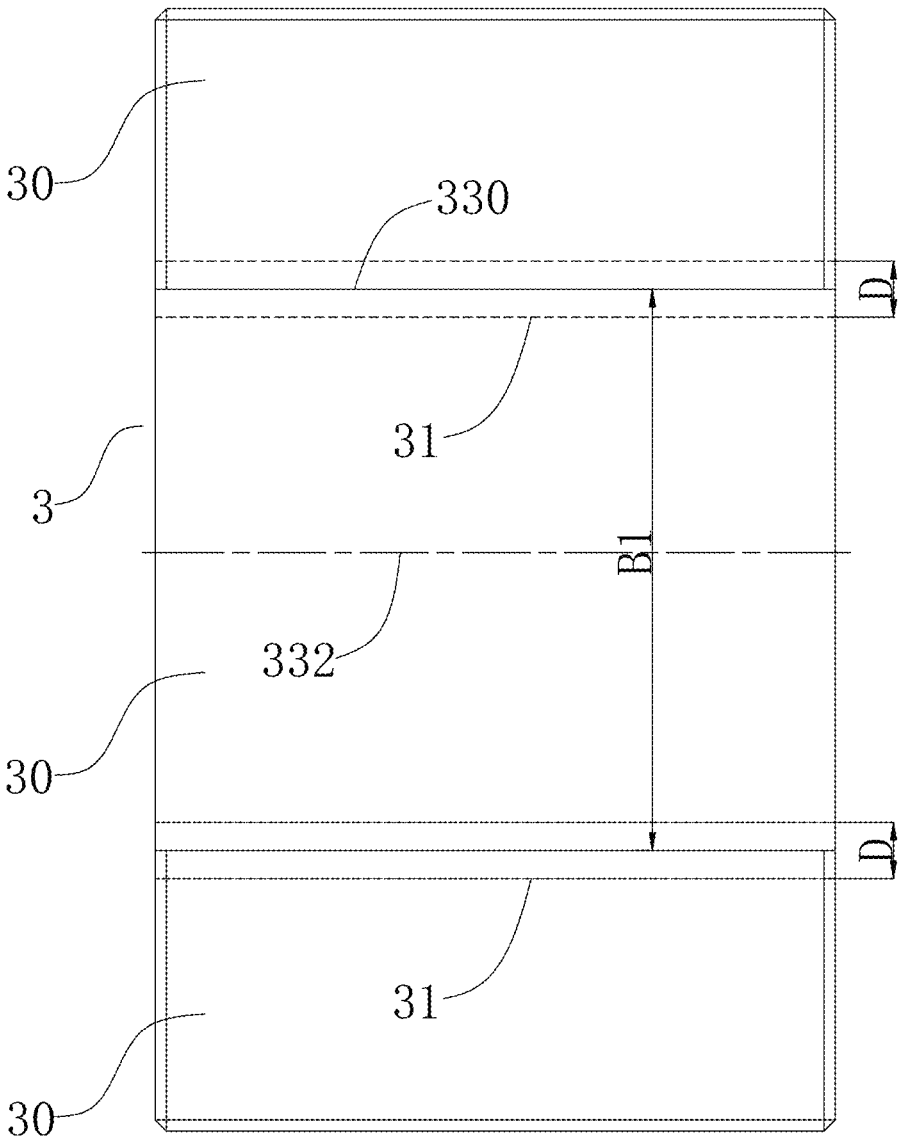
FIG. 14 is a front view of a vibrator according to an embodiment of the present application.

The position of the groove 330 is not limited, for example, it is only opened on the outer peripheral surface 33 corresponding to the non-magnetic part 31, and does not cover the magnet part 30; or it is only opened on the outer peripheral surface 33 corresponding to the magnet part 30, without covering the non-magnetic part 31; or it covers both the magnet part 30 and the non-magnetic part 31. In addition, one vibrator 3 may simultaneously have one or more slotting situations described above. In some embodiments, as shown in FIG. 13, the centerline 332 of the groove 330 is located on the second symmetry plane of the non-magnetic part 31 (the non-magnetic part 31 is symmetrical with the second symmetry plane in its thickness D direction), the second plane of symmetry is perpendicular to the first axis 16 of the vibrator 3, and the width B1 of the groove 330 is preferably greater than or equal to the thickness D of the non-magnetic part 31. In other embodiments, as shown in FIG. 14, the centerline 332 of the groove 330 is located on the magnet part 30, and its two ends cover two adjacent non-magnetic parts 31.

Since the outer peripheral surface 33 of the vibrator 3 is provided with a groove 330, the lubricating regulating oil 9 may be stored in the groove 330, which may change the frictional damping between the lubricating regulating oil 9 on the surface of the vibrator 3 and the wall of the mating hole. Further, it is also possible to adjust the damping received by the vibrator 3 when vibrating by changing the size of the groove 330, so as to facilitate the adjustment of the vibration performance of the vibrator 3.

Figure 15:
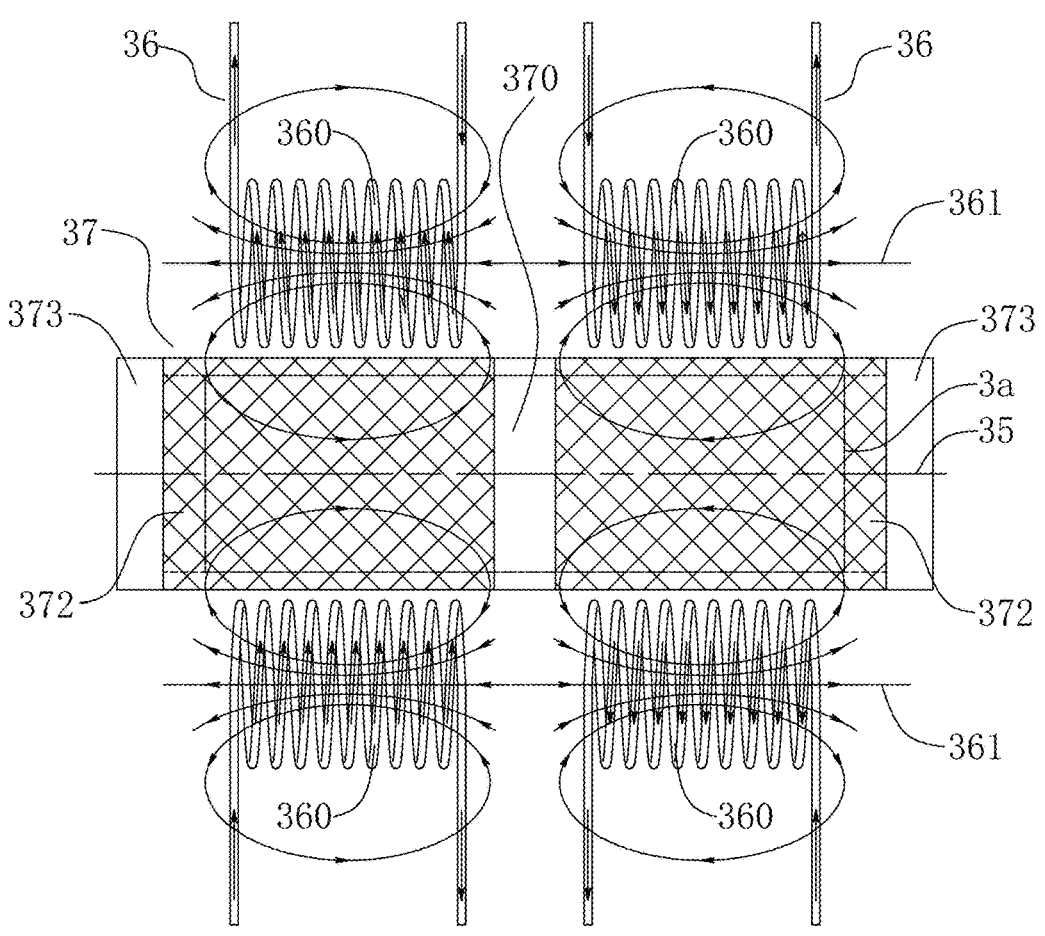
FIG. 15 is a schematic structural view of a magnetizer according to an embodiment of the present application.
Figure 16:
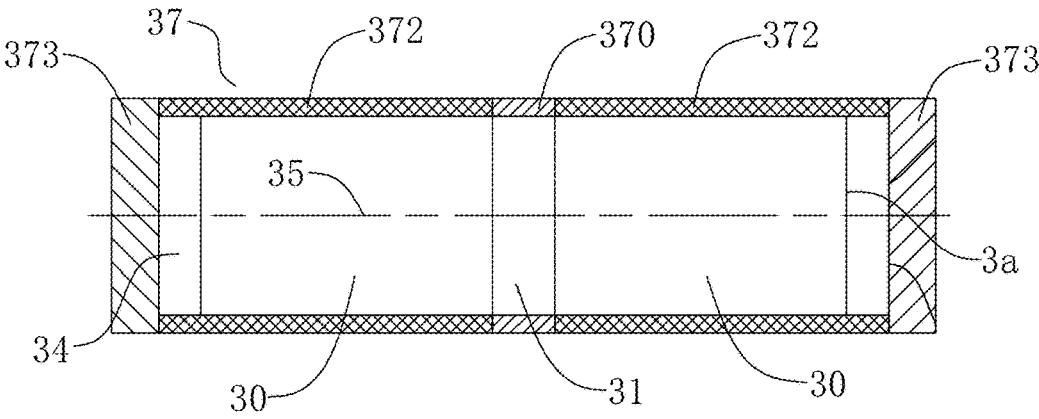
FIG. 16 is a schematic cross-sectional view of a tooling according to an embodiment of the present application.

In some embodiments, the integrally formed vibrator 3 is magnetized by a magnetizer described below. The magnetizer is used to magnetize the part to be magnetized 3a to form the vibrator 3; for the convenience of description, the vibrator 3 that needs to be magnetized is called the part to be magnetized 3a, and the part to be magnetized 3a becomes the vibrator 3 after being magnetized; the vibrator 3 that needs to be magnetized is, for example, a non-magnetic blank material or the vibrator 3 that needs to be re-magnetized after its magnetism is weakened. As shown in FIG. 15 and FIG. 16, the magnetizer includes a tooling 37 for placing the part to be magnetized 3a to be magnetized during magnetization, a plurality of magnetic field generating devices 36 arranged along the second axis 35 of the part to be magnetized 3a, and a power controller electrically connected to the magnetic field generating device 36.

The magnetic field generating device 36 is used to generate a magnetic field, so that the magnetic material placed in the magnetic field may be magnetized. In some embodiments, the magnetic field generating device 36 includes at least one magnetizing coil 360, and the central axis 361 of the magnetizing coil 360 is arranged parallel to the second axis 35 of the vibrator 3. After being energized, the magnetizing coil 360 may generate a magnetic field, and then magnetize the magnetic material within the magnetic field. The power controller is electrically connected to the magnetic field generating device 36 for supplying power to the magnetic field generating device 36; it may control parameters such as current and voltage passed into the magnetic field generating device 36, so that the magnetic field generator 36 generates a magnetic field of required strength. The magnetization method is not limited, for example, constant current magnetization or pulse magnetization.

The tooling 37 includes a magnetically conductive sleeve 370, which is made of magnetically conductive materials, such as alloys formed from various iron products and rare earth elements, etc.; in some embodiments, the magnetically conductive sleeve 370 is made of silicon steel sheet, which has excellent magnetic conduction performance.

The shape of the inner hole of the magnetically conductive sleeve 370 is consistent with that of the part to be magnetized 3a, and after the part to be magnetized 3a is set in the tooling 37, it is installed in the magnetically conductive sleeve 370, and the magnetically conductive sleeve 370 is covered outside the part to be magnetized 3a, the magnetically conductive sleeve 370 may be attached to the surface of the part to be magnetized 3a or have a certain gap. The part to be magnetized 3a includes a first part covered by the magnetically conductive sleeve 370 and at least two second parts separated by the first part, and the second part is not covered by the magnetically conductive sleeve 370.

The magnetically conductive sleeve 370 is arranged between the magnetizing coil 360 and the part to be magnetized 3a, and is used to lead out and lead away the lines of force of the magnetic field generated by the magnetizing coil 360 to produce the effect of electromagnetic shielding, so that the first part of the part to be magnetized 3a corresponding to the position of the magnetically conductive sleeve 370 may be prevented from being passed through by the magnetic force line, thereby preventing this part from being magnetized, or making this part only slightly magnetized. After magnetization, the above-mentioned non-magnetic part 31 will be formed at the first part of the part to be magnetized 3a corresponding to the position of the magnetically conductive sleeve 370, and in the second part, because the magnetic force lines may pass through this part of the material, and then this part of the material will be magnetized to magnetize this part of the material to form the above-mentioned magnet part 30; referring to FIG. 9. FIG. 9 shows the vibrator 3 formed after being magnetized by the magnetizer shown in FIG. 15.

It may be understood that the number of magnetically conductive sleeves 370 is determined according to the number of non-magnetic parts 31 that need to be formed, and when magnetized, the magnetically conductive sleeves 370 surrounds the positions corresponding to the non-magnetic parts 31 that need to be formed; in this way, after magnetization, the non-magnetic part 31 may be formed at a desired position.

Figure 17:
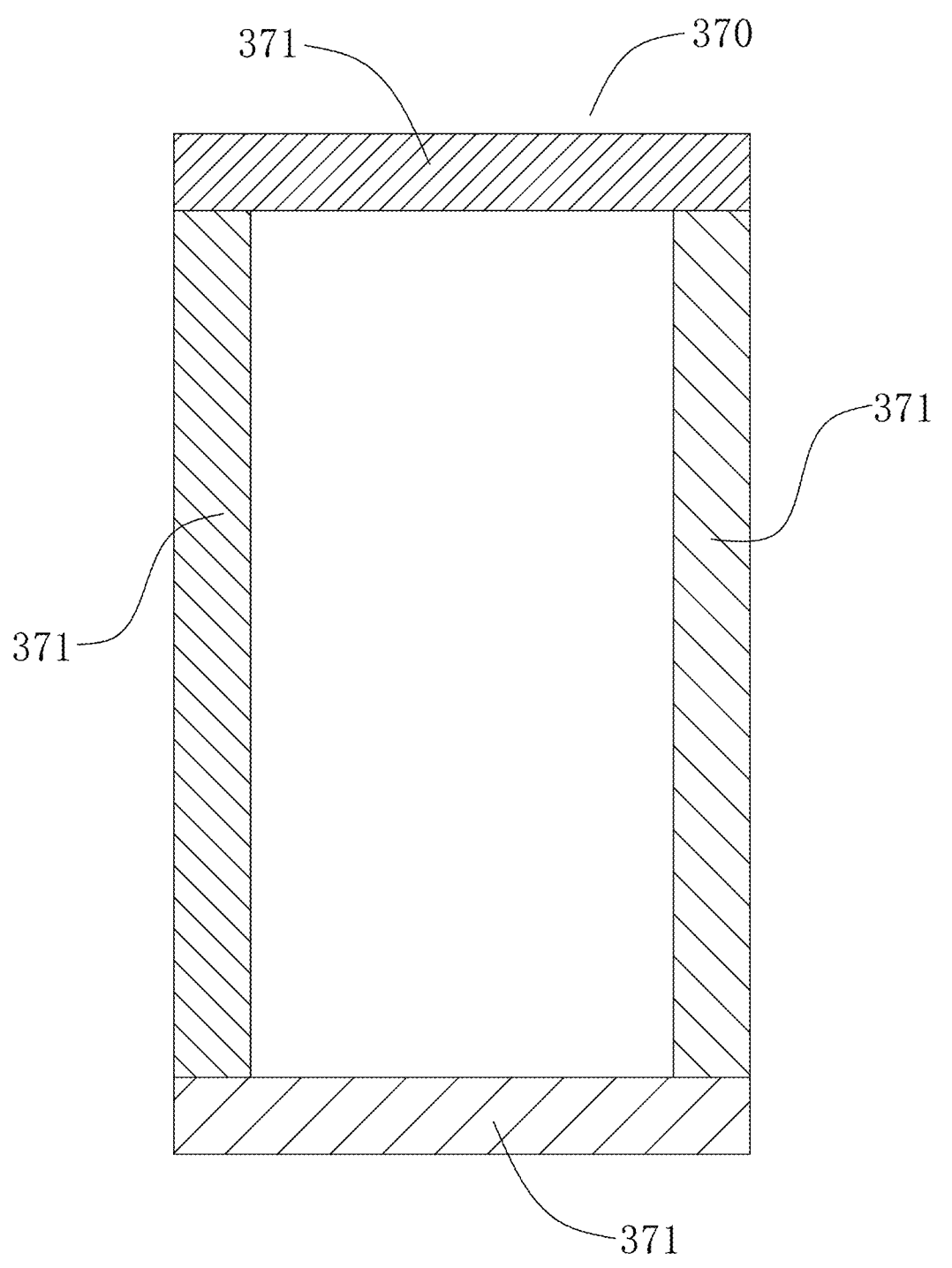
FIG. 17 is a cross-sectional view of a magnetically conductive sleeve according to an embodiment of the present application.

In some embodiments, the magnetically conductive sleeve 370 is a single ring-shaped part, for example, it is a single circular or square tubular part; in another preferred embodiment, the magnetically conductive sleeve 370 is assembled from multiple parts, for example, it includes a plurality of magnetically conductive plates 371, and the multiple magnetically conductive plates 371 are connected to form the magnetically conductive sleeve 370. Referring to FIG. 17. FIG. 17 shows the situation when the cross-section of the magnetically conductive sleeve 370 is rectangular, and it is formed by splicing four magnetically conductive plates 371.

The magnetic field generating device 36 corresponds to the position of the second part of the part to be magnetized 3a. When there are multiple magnet parts 30, the number of the second parts that needs to be magnetized is also multiple; at this time, the number of magnetic field generating devices 36 is also multiple. A magnetic field generating device 36 is correspondingly provided on the outside of the second part that needs to be magnetized. Preferably, the central axis 361 of the magnetizing coil 360 is parallel to the second axis 35 of the part to be magnetized 3a, so that the magnetic field lines generated by the magnetizing coil 360 may pass through the second part roughly along the direction of the second axis 35, thereby efficiently magnetizing the part to be magnetized 3a.

Further, in the case where the magnetic field generating device 36 includes a plurality of magnetizing coils 360, the polarity directions of the magnetic fields generated by the plurality of magnetizing coils 360 are the same, so that the magnetic field lines generated by the plurality of magnetizing coils 360 penetrate from one side of the second part to the other side in substantially the same direction, the plurality of magnetizing coils 360 may make the magnetization density of the second part more uniform, charging The magnetic saturation is better, so that the magnet part 30 has stronger magnetism after magnetization, the magnetization saturation is better, and the magnet part 30 after magnetization is stronger.

Apparently, the polarity of the magnet part 30 is opposite to that of the magnetic field generated when the magnetizing coil 360 is magnetized. In this way, during magnetization, the direction of the magnetic field generated by the magnetizing coil 360 in each magnetic field generating device 36 may be controlled to control the polarity of the corresponding magnet part 30. When the directions of the magnetic fields generated by the magnetizing coils 360 of two adjacent magnetic field generating devices 36 are opposite, the polarities of the two adjacent magnetic poles of the two adjacent magnet parts 30 on the vibrator 3 will be the same. The direction of the magnetic field generated by the magnetizing coil 360 may be controlled by the winding direction of the coil or the flow direction of the current.

Figure 18:
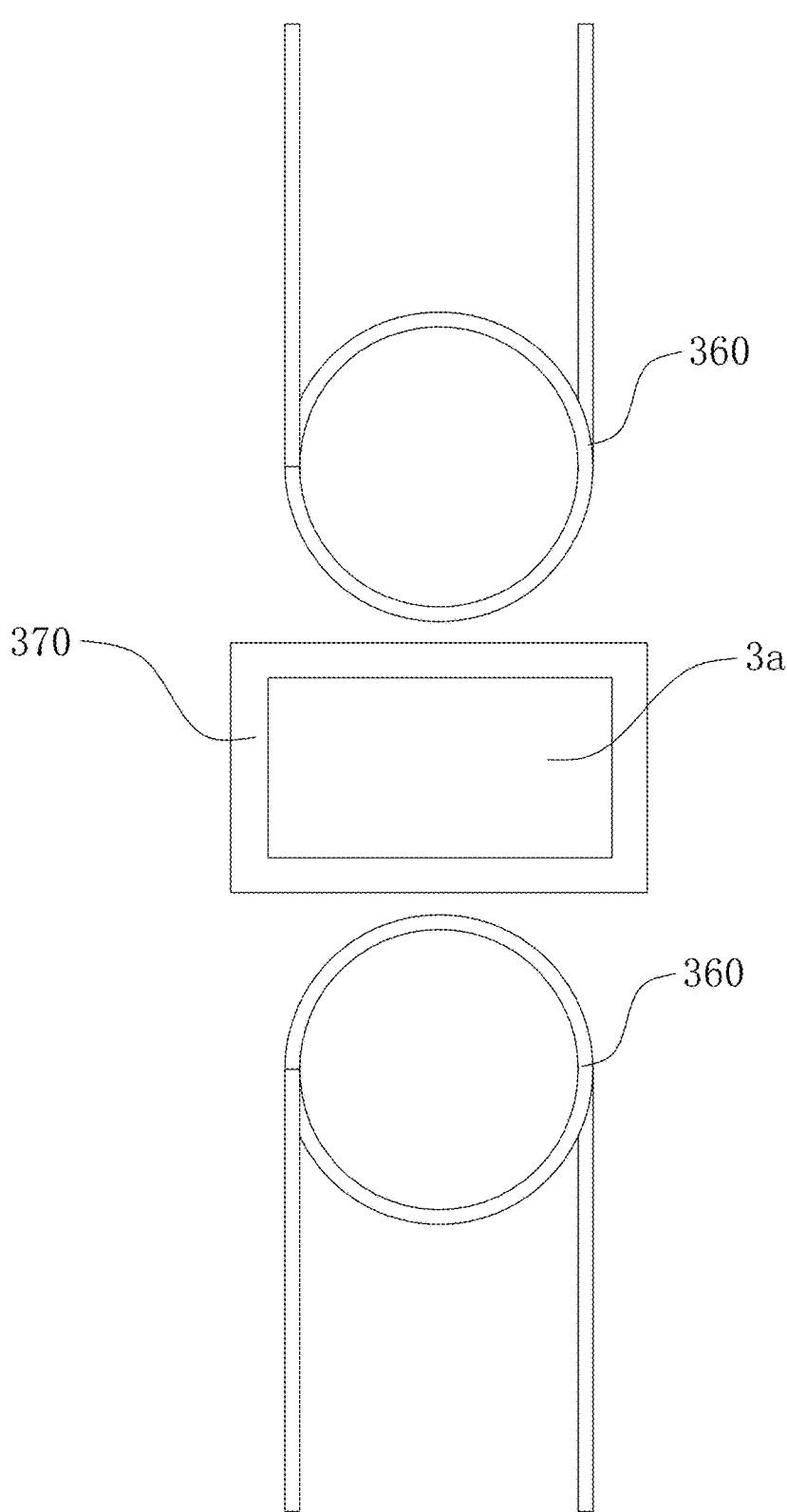
FIG. 18 is a schematic diagram of the position of the magnetic field generating device and the parts to be magnetized according to an embodiment of the present application, wherein in the FIGure, the magnetic field generating device comprises two magnetizing coils.
Figure 19:
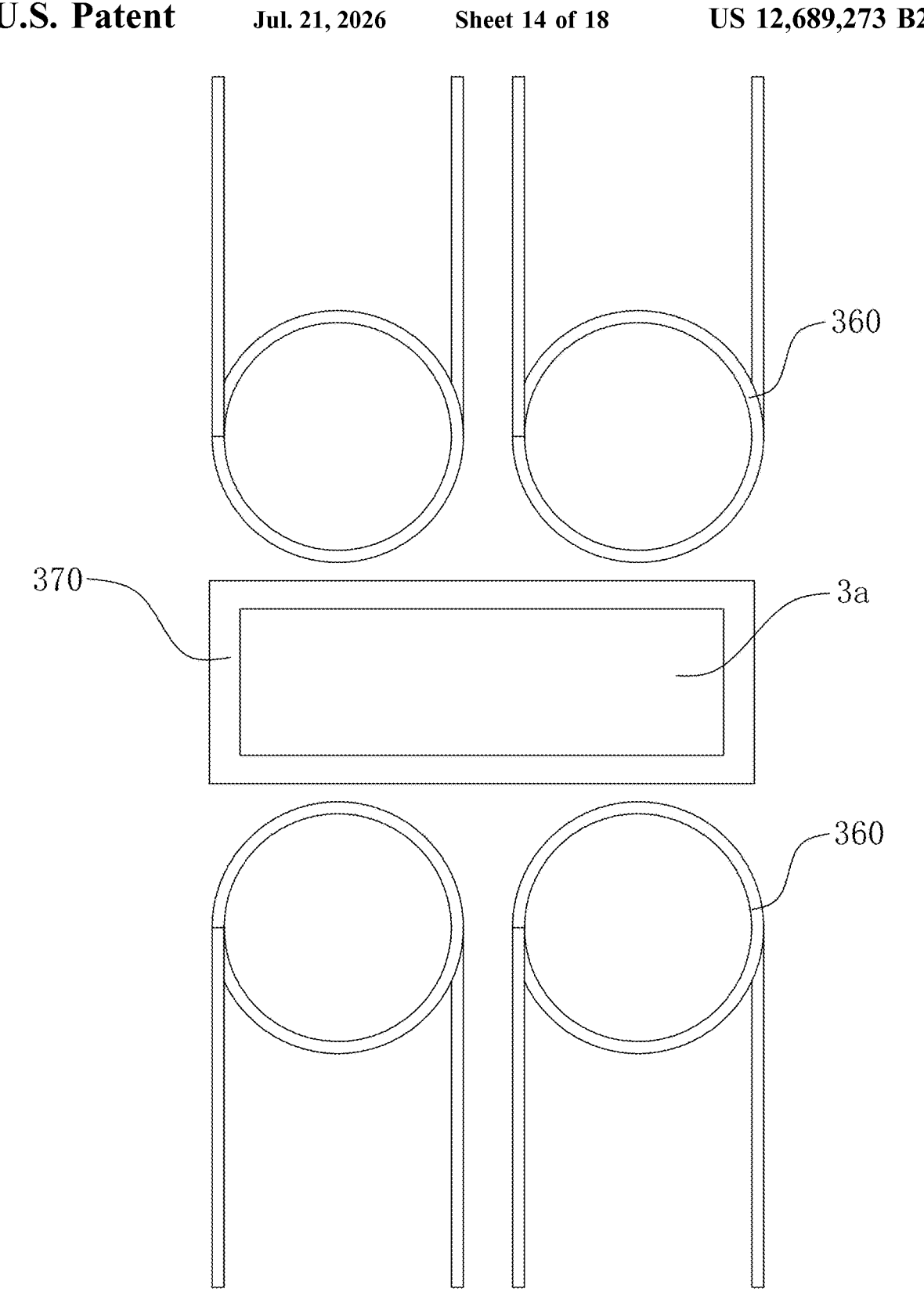
FIG. 19 is a schematic diagram of the position of the magnetic field generating device and the parts to be magnetized according to an embodiment of the present application, wherein in the FIGure, the magnetic field generating device comprises four magnetizing coils.
Figure 20:
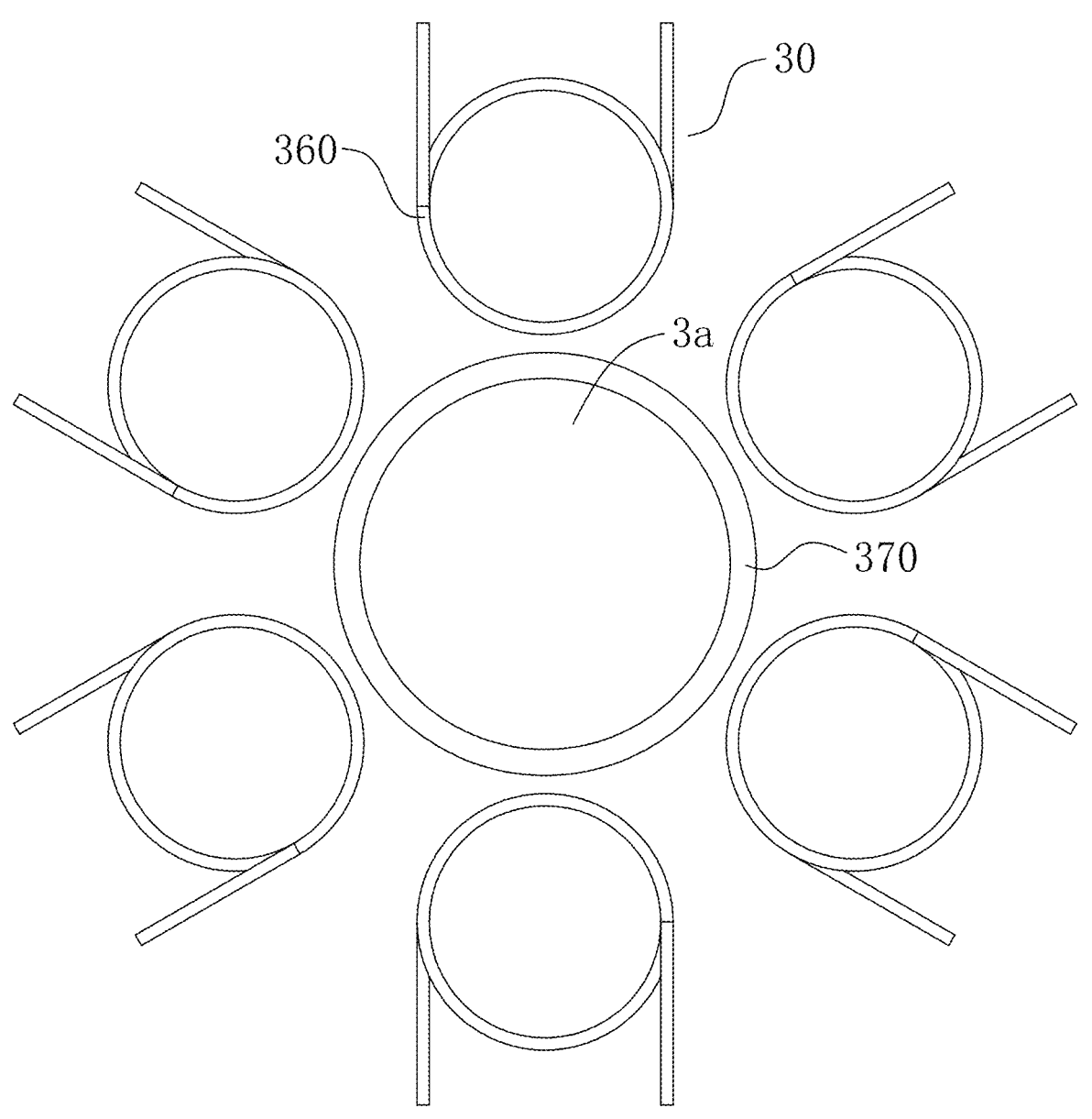
FIG. 20 is a schematic diagram of the position of the magnetic field generating device and the parts to be magnetized according to an embodiment of the present application, wherein in the FIGure, the magnetic field generating device comprises six magnetizing coils.

In some embodiments, as shown in FIG. 18 and FIG. 19, the magnetizing coil 360 of the magnetic field generating device 36 is arranged on both sides of the part to be magnetized 3a, such as the upper and lower sides or the left and right sides, and the number of magnetizing coils 360 on each side may be one or two or more; in other embodiments, as shown in FIG. 20, the magnetizing coil 360 of the magnetic field generating device 36 is arranged around the outer periphery of the part to be magnetized 3a, and its quantity is three or more (six in the figure), and preferably, the specifications of the plurality of magnetizing coils 360 are the same, and the distances to the second axis 35 of the part are consistent, so as to generate a more consistent magnetic field for magnetization.

Further, as shown in FIG. 15 and FIG. 16, the tooling 37 also includes a connecting part 372 connected to the magnetically conductive sleeve 370, and the connecting part 372 is used to connect the magnetically conductive sleeve 370, so that the part to be magnetized 3a may be better limited in the tooling 37, the form of connection between the two is not limited, for example, by gluing. The connecting part 372 is made of non-magnetic material, such as plastic, silicone, polyurethane and other materials; preferably, the connecting part 372 is made of polyurethane material, which has the advantages of easy processing and low cost.

The shape of the connecting part 372 is preferably ring-shaped, and it may be a single part, or may be formed by connecting multiple connecting plates. Preferably, the connecting part 372 is consistent with the shape of the magnetically conductive sleeve 370, and it cooperates with the magnetically conductive sleeve 370 to form the installation hole 34; during magnetization, the part to be magnetized 3a is arranged in the installation hole 34, so that the installation of the part to be magnetized 3a is more convenient, and the magnetic conduction effect of the magnetically conductive sleeve 370 is better.

Further preferably, the connecting parts 372 at both ends extend beyond the outer end of the magnet part 30, and the tooling 37 also includes a magnetic block 373, which is connected to the end of the connecting part 372 and seals the installation hole 34 to improve the magnetizing effect.

In some embodiments, the magnetizer also includes a position adjustment mechanism for adjusting the relative position of the magnetic field generating device 36 and the part to be magnetized 3a, which may be manual, automatic or semi-automatic. Preferably, the position adjustment mechanism is automatic or semi-automatic, and it is connected with the magnetic field generating device 36, and the relative position of the magnetic field generating device 36 and the part to be magnetized 3a is adjusted by moving the magnetic field generating device 36. The position adjustment mechanism may at least drive the magnetic field generating device 36 to move along the second axis 35 of the part to be magnetized 3a, for example, the magnetic field generating device 36 is driven to move by mechanisms such as an electric cylinder, an air cylinder, an electric push rod, a servo module, or a rack and pinion; preferably, the position adjustment mechanism may also drive the magnetic field generating device 36 to be radially close to or away from the part to be magnetized 3a; further preferably, the position adjustment mechanism may also drive the magnetic field generating device 36 to rotate around the second axis 35 of the part to be magnetized 3a to adjust the angle. In this way, during magnetization, parameters such as the position and size of the non-magnetic part 31 and the magnet part 30 formed after magnetization may be adjusted by changing the position of the magnetic field generating device 36.

Through the above-mentioned magnetizer, it is only necessary to place the part to be magnetized 3a in the tooling 37 to a limited position, and then energize the magnetic field generating device 36 to magnetize the part to be magnetized 3a, and then the vibrator 3 may be conveniently obtained, which is very convenient to use.

It may be understood that since the vibrator 3 is a single part formed by magnetization, it has higher dimensional accuracy than the way of connecting multiple magnets, thereby further improving the assembly accuracy of the vibrator 3 in the guide sleeve 6, this makes it difficult for the vibrator 3 to collide with components such as the guide sleeve 6 and the coil 2 when vibrating, thereby ensuring the reliability and stability of the operation and avoiding the loss of the magnetic circuit caused by assembly errors. Moreover, the gap between the vibrator 3 and the coil 2 may also be made smaller, so as to improve the driving force of the coil 2 on the vibrator 3. In addition, when multiple magnets are connected, they should be connected in the form that the same poles of the two magnets are close together; due to the existence of repulsion, the connection is very difficult, which further reduces the dimensional accuracy after the connection is completed, while the vibrator 3 is manufactured by magnetization, which is more convenient to process, may reduce the cost of accessories and labor costs in the assembly process, and improve production efficiency.

Further, the transition between the magnet parts 30 and the non-magnetic parts 31 on the vibrator 3 is very smooth, so that the surface magnetic field of the vibrator 3 forms a relatively complete sine wave state distribution.

Figure 21:
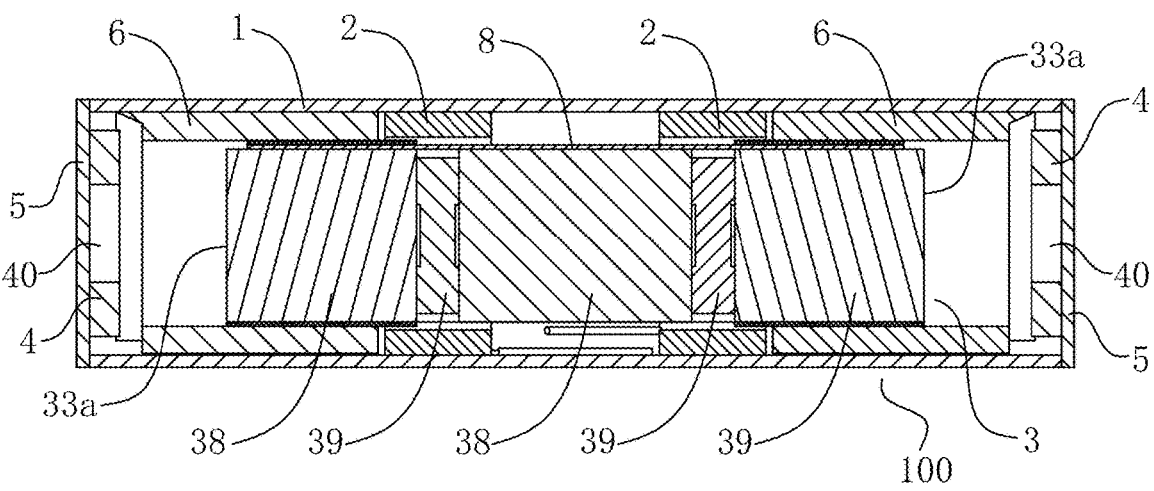
FIG. 21 is a cross-sectional view of a broadband vibration motor according to an embodiment of the present application.
Figure 22:
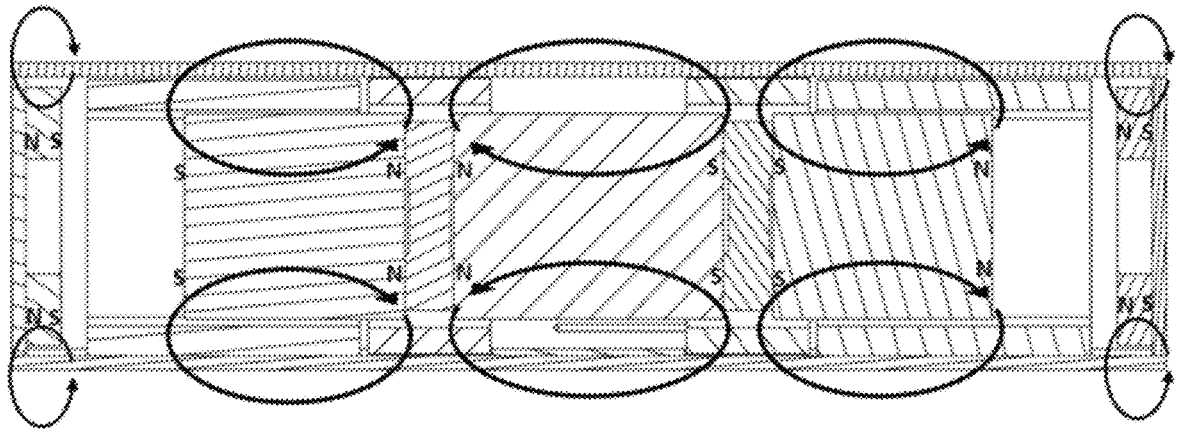
FIG. 22 is a schematic diagram of the polarity of the reset member and the vibrator in the broadband vibration motor shown in FIG. 21 in the present application.

In some embodiments, the vibrator 3 is formed by connecting multiple parts. The vibrator 3 includes at least two magnetic parts 38 and a magnetically conductive part 39 connected between two adjacent magnetic parts 38; the magnetically conductive part 39 is in the shape of a plate or block, and it may be connected with the magnetic piece 38 by, for example, gluing. The two reset parts 4 are both magnets, and the direction of the force exerted by them on the ends of the vibrator 3 adjacent to them is opposite, so that the vibrator 3 will not be biased to one side. In some embodiments, referring to FIG. 21 and FIG. 22, the vibrator 3 includes three magnetic parts 38 and two magnetically conductive parts 39, the reset part 4 on the left and the two adjacent magnetic poles of the vibrator 3 are both S poles, the reset part 4 on the right and the two adjacent magnetic poles of the vibrator 3 are both N poles, and the two reset parts 4 both exert a repulsive force on the vibrator 3 to drive the vibrator 3 to reset. The resetting of the vibrator 3 is driven by the magnetic force of the magnet, which may effectively avoid defects such as performance degradation or fatigue fracture of the elastic part due to long-term use. In other embodiments, referring to FIG. 23, the vibrator 3 includes five magnetic parts 38 and four magnetically conductive parts 39, and one magnetically conductive part 39 is connected between every two magnetic parts 38.

In some embodiments, the area around the vibrator 3 surrounded by the coil 2 includes the magnetically conductive part 39, that is, the thickness B of the coil 2 is greater than or equal to the thickness of the magnetically conductive part 39.

Figure 24:
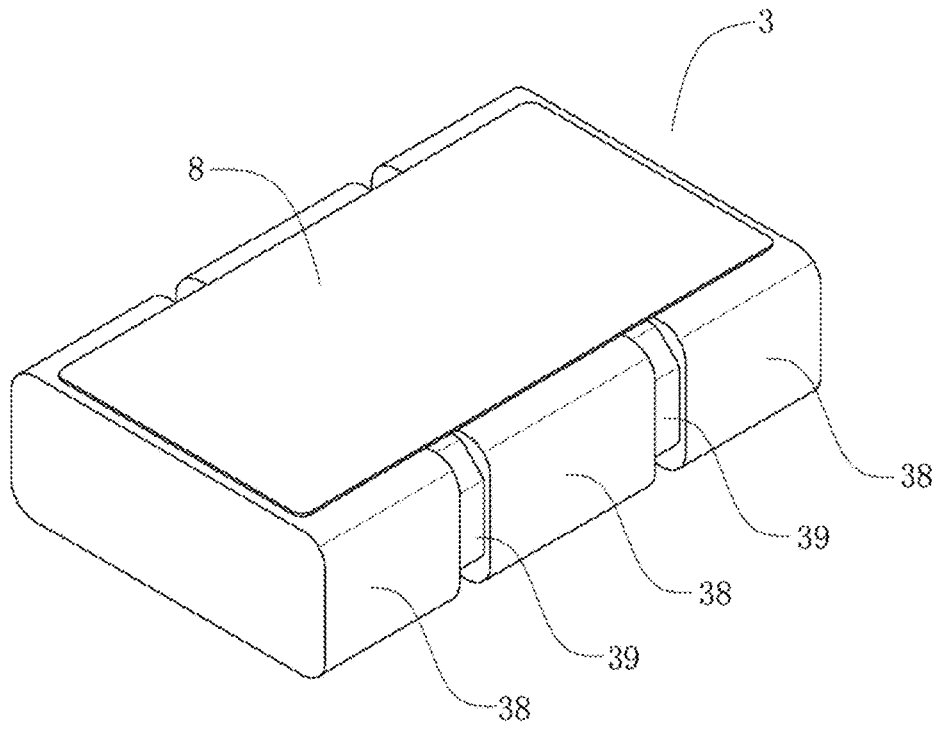
FIG. 24 is a schematic perspective view of a vibrator according to an embodiment of the present application.
Figure 25:
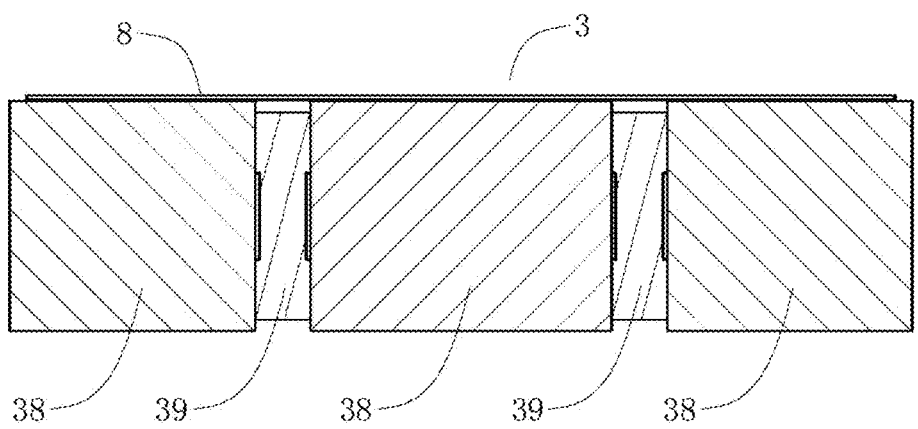
FIG. 25 is a cross-sectional view of the vibrator shown in FIG. 24.

In some embodiments, referring to FIG. 24 and FIG. 25, the vibrator 3 further includes a fixed piece 8, and the fixed piece 8 is fixed to a plurality of magnetic part 38 (for example, it is fixedly connected with the magnetic part 38 at the center and the two magnetic parts 38 at the end); the thickness of the fixed piece 8 is 0.01-0.3 mm; the material of the fixed piece 8 is non-magnetic stainless steel material, non-magnetic alloy material or non-magnetic polymer material; the polymer material is preferably PET or POM.

The fixed piece 8 connects the magnetic part 38 at the center and the magnetic part 38 at the end through a rigid piece, absorbing the load brought by the pulling force and shearing force, increasing the structural strength and avoiding the risk of fracture, thereby improving the reliability of the vibrator 3.

In some embodiments, referring to FIG. 1, the reset part 4 is a solid plate structure without openings. In other embodiments, referring to FIG. 21, the reset part 4 is a plate structure with a central opening 40; the reset part 4 is arranged opposite to the magnetic part 38 at the end of the vibrator 3, and the end face size of the reset part 4 is greater than or equal to the end face size of the magnetic part 38 at the end.

Specifically, the area enclosed by the outermost edge of the end surface of the reset part 4 is greater than the area of the end surface of the magnetic part 38. The purpose of setting the reset part 4 as a plate structure is to provide a large end face on the premise of reducing the design volume as much as possible, which is used to adapt to the end face area of the vibrator 3; the reset part 4 is set as a central opening structure because the complete plate-type reset part 4 may generate a magnetic force exceeding the requirement, so it is necessary to reduce the volume of the reset part 4 to reduce the magnetic force.

In present application, it is an implementation in a more preferred embodiment when the end face size of the reset part 4 is greater than or equal to the end face size of the magnetic part 38 at the end; if the end face size of the reset part 4 is smaller than the end face size of the magnetic part 38, in fact, the broadband vibration motor may also vibrate, but the vibrator 3 will sway, which will affect the final performance; the technical solution in which the end face size of the reset part 4 is smaller than the end face size of the magnetic part 38 should be regarded as an equivalent alternative of the technical solution of this patent, and should not be regarded as going beyond the protection scope of this patent.

The broadband vibration motor of the above embodiments may be applied to portable electronic devices such as mobile phones and handheld game consoles to provide vibration functions; by setting a magnet (i.e., reset part 4) at the two ends of the housing 100, a balanced magnetic field is set inside the housing 100; compared with the traditional unilateral magnetic field design, the vibrator 3 of the invention may provide vibration effects in a smaller travel range, thereby providing a more uniform vibration response in a wider frequency band and providing customers with richer and more delicate tactile feedback; especially in the entertainment equipment, it may be possible to provide a completely different level of different feeling of vibration feedback in different virtual scenes, which enhances the entertainment equipment user's realistic experience.

In some embodiments, the frequency of the voltage provided by the flexible circuit board 13 to the coil 2 is the same as the natural frequency of the vibrator 3; at this time, the vibrator 3, specifically the magnetically conductive part 39, is subjected to a periodically changing electromagnetic force, and its frequency of the electromagnetic force is equal to the natural frequency of the vibrator 3, and under the action of the periodic electromagnetic force, the vibrator 3 generates strong resonance.

The technical solution of the present application will be further described in detail through several specific examples below, but the protection scope of the present application is not limited to the examples.

Embodiment 1

According to a broadband vibration motor shown in FIG. 21, FIG. 22, FIG. 24 and FIG. 25, it includes a case 100, a vibrator 3, a reset part 4 and a coil 2.

The vibrator 3 includes two end surfaces 33a and an outer peripheral surface 33 connected between the two end surfaces 33a.

There are two reset part 4, which are respectively arranged on both sides of the vibrator 3 and opposite to the two end surfaces 33a of the vibrator 3 respectively.

The coil 2 is arranged around the outer peripheral surface 33 of the vibrator 3.

The reset part 4 is fixedly arranged on the inner end of the case 100 (specifically, on the end cover 5), the coil 2 is arranged on the inner side of the case 100 (specifically, on the inner wall 1a of the housing 1), and the outer peripheral surface 33 of the vibrator 3 is provided with the lubricating regulating oil 9, the vibrator 3 is suspended in the cavity of the case 100 through the lubricating regulating oil 9.

The vibrator 3 includes three magnetic parts 38 and two magnetically conductive parts 39, the magnetically conductive parts 39 are connected between two adjacent magnetic parts 38, and the two magnetic parts 38 at the outer ends are symmetrically arranged on the magnetic part 38 at the center sides. The range around the vibrator 3 of the coil 2 includes the magnetically conductive part 39.

The vibrator 3 further includes a fixed piece 8, which is fixedly connected to the central magnetic part 38 and the magnetic part 38 at the end; the thickness of the fixed piece 8 is 0.1 mm; the material of the fixed piece 8 is stainless steel.

The reset part 4 is a magnet, which is a plate structure provided with a central opening 40; the reset part 4 is arranged opposite to the magnetic part 38 at the end, and the end surface size of the reset part 4 is larger than that of the magnetic part 38 at the end.

The broadband vibration motor also includes a guide sleeve 6, which is fixedly arranged on the inner wall 1a of the housing 1, the guide sleeve 6 is arranged around the outer peripheral surface 33 of the vibrator 3, and the lubricating regulating oil 9 is filled between the guide sleeve 6 and the outer peripheral surface 33 of the vibrator 3.

Embodiment 2

Figure 23:
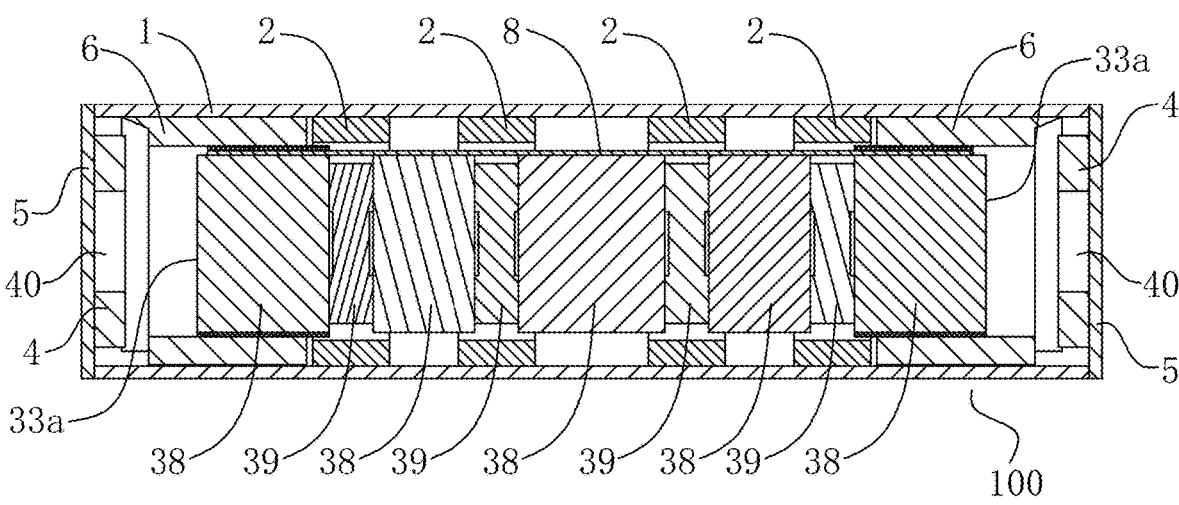
FIG. 23 is a cross-sectional view of a broadband vibration motor according to an embodiment of the present application.

According to a broadband vibration motor shown in FIG. 23, it includes a case 100, a vibrator 3, a reset part 4 and a coil 2.

The vibrator 3 includes two end surfaces 33a and an outer peripheral surface 33 connected between the two end surfaces 33a.

There are two reset parts 4, which are respectively arranged on both sides of the vibrator 3 and opposite to the two end surfaces 33a of the vibrator 3 respectively.

The coil 2 is arranged around the outer peripheral surface 33 of the vibrator 3.

The reset part 4 is fixedly arranged on the inner end of the case 100 (specifically, on the end cover 5), the coil 2 is arranged on the inner side of the case 100 (specifically, on the inner wall 1a of the housing 1), and the outer peripheral surface 33 of the vibrator 3 is provided with the lubricating regulating oil 9, the vibrator 3 is suspended in the cavity of the case 100 through the lubricating regulating oil 9.

The vibrator 3 includes five magnetic parts 38 and four magnetically conductive parts 39, one magnetically conductive part 39 is arranged between two adjacent magnetic parts 38, and except for the magnetic part 38 in the center, the other four magnetic pieces 38 are symmetrical arranged on both sides of the magnetic part 38 located in the center; the range around the vibrator 3 of the coil 2 includes the magnetically conductive part 39.

The vibrator 3 also includes a fixed piece 8, which is fixedly connected with five magnetic parts 38; the thickness of the fixed piece 8 is 0.05 mm; the material of the fixed piece 8 is PET polymer material.

The reset part 4 is a magnet, which is a plate structure provided with a central opening 40; the reset part 4 is arranged opposite to the magnetic part 38 at the end, and the end surface size of the reset part 4 is larger than that of the magnetic part 38 at the end.

The broadband vibration motor further includes a guide sleeve 6, which is fixedly arranged on the inner wall 1a of the housing 1, the guide sleeve 6 is arranged around the outer peripheral surface 33 of the vibrator 3, and the lubricating regulating oil 9 is filled between the guide sleeve 6 and the outer peripheral surface 33 of the vibrator 3.

Embodiment 3

A broadband vibration motor based on Embodiment 1, wherein the difference is that described lubricating regulating oil comprises 96.5 parts of mineral oils, 0.7 parts of petroleum calcium sulfonate, 0.16 parts of zinc dialkyl dithiophosphates, 0.15 parts of organic molybdenum. 0.3 parts of alkyl diphenylamine and 1 part of polymethacrylate by weight. The mineral oil was purchased from Jinan Danlong Chemical Co., Ltd., model: 3-100. The calcium petroleum sulfonate was purchased from Guangzhou Lihou Trading Co., Ltd., item number: T106. The zinc dialkyldithiophosphate was purchased from Kunshan Shengan Biotechnology Co., Ltd., CAS number: 68649-42-3, article number: ZDDP, and the friction coefficient of the zinc dialkyl dithiophosphate was 0.08, the coefficient of friction is obtained by referring to the test method of SH/T0190-1992. The organic molybdenum is molybdenum dialkyl dithiophosphate, the molybdenum dialkyl dithiophosphate was purchased from Hangzhou Stern Chemical Co., Ltd., CAS No.: 72030-25-2, the coefficient of friction of the molybdenum dialkyl dithiophosphate is 0.06, and the coefficient of friction is obtained by referring to the test method of SH/T0190-1992. The alkyl diphenylamine was purchased from Hubei Xinkang Pharmaceutical Chemical Co., Ltd., CAS number: 68921-45-9. The polymethacrylate was purchased from Jinzhou Shengda Chemicals Co., Ltd., item number: T602, referring to GB/T265, and its kinematic viscosity at 100° C. was 400 mm²/S.

The second aspect of this embodiment provides the preparation method of lubricating regulating oil, the preparation method of the lubricating regulating oil is obtained by mixing and stirring mineral oil, calcium petroleum sulfonate, zinc dialkyl dithiophosphate, organic molybdenum, alkyl diphenylamine and polymethacrylate.

Embodiment 4

A kind of broadband vibration motor based on Embodiment 1, wherein, the difference is that the lubricating regulating oil includes 97.5 parts of mineral oil, 1.2 parts of petroleum calcium sulfonate, 0.32 parts of dialkyl zinc dithiophosphate, 0.35 parts of organic molybdenum, 0.6 parts of alkyl diphenylamine and 1.5 parts of polymethacrylate by weight. The mineral oil was purchased from Jinan Danlong Chemical Co., Ltd., model: 3-100. The calcium petroleum sulfonate was purchased from Guangzhou Lihou Trading Co., Ltd., item number: T106. The zinc dialkyldithiophosphate was purchased from Kunshan Shengan Biotechnology Co., Ltd., CAS number: 68649-42-3, item number: ZDDP, and the friction coefficient of the zinc dialkyl dithiophosphate was 0.08, the coefficient of friction is obtained by referring to the test method of SH/T0190-1992. The organic molybdenum is molybdenum dialkyl dithiophosphate, the molybdenum dialkyl dithiophosphate was purchased from Hangzhou Stern Chemical Co., Ltd., CAS number: 72030-25-2, the coefficient of friction of the molybdenum dialkyl dithiophosphate is 0.06, and the coefficient of friction is obtained by referring to the test method of SH/T0190-1992. The alkyl diphenylamine was purchased from Hubei Xinkang Pharmaceutical Chemical Co., Ltd., CAS number: 68921-45-9. The polymethacrylate was purchased from Jinzhou Shengda Chemicals Co., Ltd., item number: T602, referring to GB/T265, and its kinematic viscosity at 100° C. was 400 mm²/S.

The second aspect of this embodiment provides the preparation method of lubricating regulating oil, the preparation method of the lubricating regulating oil is mixing and stirring mineral oil, calcium petroleum sulfonate, zinc dialkyl dithiophosphate, organic molybdenum, alkyl diphenylamine and polymethacrylate and then it is obtained.

The second aspect of this embodiment provides the preparation method of lubricating regulating oil, the preparation method of the lubricating regulating oil is mixing and stirring mineral oil, calcium petroleum sulfonate, zinc dialkyl dithiophosphate, organic molybdenum, alkyl diphenylamine and polymethacrylate and then it is obtained.

Embodiment 5

A kind of broadband vibration motor based on Embodiment 1, wherein, the difference is that the lubricating regulating oil includes 96.5 parts of mineral oil, 0.7 parts of petroleum calcium sulfonate, 0.16 parts of dialkyl zinc dithiophosphate. 0.15 parts of organic molybdenum, 0.3 parts of alkyl diphenylamine and 1 part of polymethacrylate by weight. The mineral oil was purchased from Jinan Danlong Chemical Co., Ltd., model: 3-100. The calcium petroleum sulfonate was purchased from Guangzhou Lihou Trading Co., Ltd., item number: T106. The zinc dialkyldithiophosphate was purchased from Kunshan Shengan Biotechnology Co., Ltd., CAS number: 68649-42-3, article number: ZDDP, and the friction coefficient of the zinc dialkyl dithiophosphate was 0.08, the coefficient of friction is obtained by referring to the test method of SH/T0190-1992. The organic molybdenum is molybdenum dialkyl dithiophosphate, the molybdenum dialkyl dithiophosphate was purchased from Hangzhou Stern Chemical Co., Ltd., CAS No.: 72030-25-2, the coefficient of friction of the molybdenum dialkyl dithiophosphate is 0.06, and the coefficient of friction is obtained by referring to the test method of SH/T0190-1992. The alkyl diphenylamine was purchased from Hubei Xinkang Pharmaceutical Chemical Co., Ltd., CAS number: 68921-45-9. The polymethacrylate was purchased from Hebei Tuofu Lubrication Conditioning Oil Additive Co., Ltd., item number: T248, referring to GB/T265, and its kinematic viscosity at 100° C. was 359 mm²/S.

The second aspect of this embodiment provides the preparation method of lubricating regulating oil, the preparation method of the lubricating regulating oil by mixing and stirring mineral oil, calcium petroleum sulfonate, zinc dialkyl dithiophosphate, organic molybdenum, alkyl diphenylamine and polymethacrylate and then it is obtained.

Embodiment 6

A kind of broadband vibration motor based on Embodiment 1, wherein, the difference is that the lubricating regulating oil includes 96.5 parts of mineral oil, 0.7 parts of petroleum calcium sulfonate, 0.16 parts of dialkyl zinc dithiophosphate, 0.15 parts of organic molybdenum, 0.3 parts of alkyl diphenylamine and 5 parts of polymethacrylate by weight. The mineral oil was purchased from Jinan Danlong Chemical Co., Ltd., model: 3-100. The calcium petroleum sulfonate was purchased from Guangzhou Lihou Trading Co., Ltd., item number: T106. The zinc dialkyldithiophosphate was purchased from Kunshan Shengan Biotechnology Co., Ltd., CAS number: 68649-42-3, article number: ZDDP, and the friction coefficient of the zinc dialkyl dithiophosphate was 0.08, the coefficient of friction is obtained by referring to the test method of SH/T0190-1992. The organic molybdenum is molybdenum dialkyl dithiophosphate, the molybdenum dialkyl dithiophosphate was purchased from Hangzhou Stern Chemical Co., Ltd., CAS No.: 72030-25-2, the alkyl diphenylamine was purchased from Hubei Xinkang Pharmaceutical Chemical Co., Ltd., CAS number: 68921-45-9, the coefficient of friction of the molybdenum dialkyl dithiophosphate is 0.06, and the coefficient of friction is obtained by referring to the test method of SH/T0190-1992. The polymethacrylate was purchased from Jinzhou Shengda Chemicals Co., Ltd., item number: T602, referring to GB/T265, and its kinematic viscosity at 100° C. was 400 mm²/S.

The second aspect of this embodiment provides the preparation method of lubricating regulating oil, the preparation method of the lubricating regulating oil is mixing and stirring mineral oil, calcium petroleum sulfonate, zinc dialkyl dithiophosphate, organic molybdenum, alkyl diphenylamine and polymethacrylate, and then it is obtained.

Embodiment 7

A kind of broadband vibration motor based on Embodiment 1, wherein, the difference is that the lubricating regulating oil includes 96.5 parts of mineral oil. 0.7 parts of petroleum calcium sulfonate, 0.16 parts of dialkyl zinc dithiophosphate, 0.15 parts of organic molybdenum and 0.3 parts of alkyl diphenylamine by weight. The mineral oil was purchased from Jinan Danlong Chemical Co., Ltd., model: 3-100. The calcium petroleum sulfonate was purchased from Guangzhou Lihou Trading Co., Ltd., item number: T106. The zinc dialkyldithiophosphate was purchased from Kunshan Shengan Biotechnology Co., Ltd., CAS number: 68649-42-3, article number: ZDDP, and the friction coefficient of the zinc dialkyl dithiophosphate was 0.08, the coefficient of friction is obtained by referring to the test method of SH/T0190-1992. The organic molybdenum is molybdenum dialkyl dithiophosphate, the molybdenum dialkyl dithiophosphate was purchased from Hangzhou Stern Chemical Co., Ltd., CAS No.: 72030-25-2, the coefficient of friction of the molybdenum dialkyl dithiophosphate is 0.06, and the coefficient of friction is obtained by referring to the test method of SH/T0190-1992. The alkyl diphenylamine was purchased from Hubei Xinkang Pharmaceutical Chemical Co., Ltd., CAS number: 68921-45-9.

The second aspect of this embodiment provides the preparation method of lubricating regulating oil, the preparation method of the lubricating regulating oil is mixing and stirring mineral oil, calcium petroleum sulfonate, zinc dialkyl dithiophosphate, organic molybdenum and alkyl diphenylamine, and then it is obtained.

Embodiment 8

A kind of broadband vibration motor based on Embodiment 1, wherein, the difference is that the lubricating regulating oil includes 96.5 parts of mineral oil, 0.7 parts of petroleum calcium sulfonate, 0.16 parts of dialkyl zinc dithiophosphate. 0.15 parts of organic molybdenum, 0.3 parts of alkyl diphenylamine and 1 parts of polymethacrylate by weight. The mineral oil was purchased from Jinan Danlong Chemical Co., Ltd., model: 3-100. The calcium petroleum sulfonate was purchased from Guangzhou Lihou Trading Co., Ltd., item number: T106. The zinc dialkyldithiophosphate was purchased from Kunshan Shengan Biotechnology Co., Ltd., CAS number: 68649-42-3, article number: ZDDP, and the friction coefficient of the zinc dialkyl dithiophosphate was 0.08, the coefficient of friction is obtained by referring to the test method of SH/T0190-1992. The organic molybdenum is molybdenum dialkyl dithiophosphate, the molybdenum dialkyl dithiophosphate was purchased from Hangzhou Stern Chemical Co., Ltd., CAS No.: 72030-25-2, the coefficient of friction of the molybdenum dialkyl dithiophosphate is 0.06, and the coefficient of friction is obtained by referring to the test method of SH/T0190-1992. The alkyl diphenylamine was purchased from Hubei Xinkang Pharmaceutical Chemical Co., Ltd., CAS number: 68921-45-9. The polymethacrylate was purchased from Hebei Tuofu Lubrication Conditioning Oil Additive Co., Ltd., item number: T6020, referring to GB/T265, and its kinematic viscosity at 100° C. was 240 mm²/S.

The second aspect of this embodiment provides the preparation method of lubricating regulating oil, the preparation method of the lubricating regulating oil is mixing and stirring mineral oil, calcium petroleum sulfonate, zinc dialkyl dithiophosphate, organic molybdenum, alkyl diphenylamine and polymethacrylate, and then it is obtained.

Embodiment 9

A kind of broadband vibration motor based on Embodiment 1, wherein, the difference is that the lubricating regulating oil includes 96.5 parts of mineral oil. 0.7 parts of petroleum calcium sulfonate. 0.16 parts of dialkyl zinc dithiophosphate, 0.15 parts of organic molybdenum, 0.3 parts of alkyl diphenylamine and 1 parts of polymethacrylate by weight. The mineral oil was purchased from Jinan Danlong Chemical Co., Ltd., model: 3-100. The calcium petroleum sulfonate was purchased from Guangzhou Lihou Trading Co., Ltd., item number: T106. The zinc dialkyldithiophosphate was purchased from Kunshan Shengan Biotechnology Co., Ltd., CAS number: 68649-42-3, article number: ZDDP, and the friction coefficient of the zinc dialkyl dithiophosphate was 0.08, the coefficient of friction is obtained by referring to the test method of SH/T0190-1992. The organic molybdenum is molybdenum dialkyl dithiophosphate, the molybdenum dialkyl dithiophosphate was purchased from Hangzhou Stern Chemical Co., Ltd., CAS No.: 72030-25-2, the coefficient of friction of the molybdenum dialkyl dithiophosphate is 0.06, and the coefficient of friction is obtained by referring to the test method of SH/T0190-1992. The alkyl diphenylamine was purchased from Hubei Xinkang Pharmaceutical Chemical Co., Ltd., CAS number: 68921-45-9. The polymethacrylate was purchased from Hebei Tuofu Lubrication Conditioning Oil Additive Co., Ltd., item number: T6-310, referring to GB/T265, and its kinematic viscosity at 100° C. was 1500 mm²/S.

The second aspect of this embodiment provides the preparation method of lubricating regulating oil, the preparation method of the lubricating regulating oil is mixing and stirring mineral oil, calcium petroleum sulfonate, zinc dialkyl dithiophosphate, organic molybdenum, alkyl diphenylamine and polymethacrylate, and then it is obtained.

Embodiment 10

A kind of broadband vibration motor based on Embodiment 1, wherein, the difference is that the lubricating regulating oil includes 93 parts of mineral oil, 2.5 parts of petroleum calcium sulfonate, 0.7 parts of dialkyl zinc dithiophosphate, 0.4 parts of organic molybdenum, 0.5 parts of alkyl diphenylamine and 1.5 parts of polymethacrylate by weight. The mineral oil was purchased from Jinan Danlong Chemical Co., Ltd., model: 3-100. The calcium petroleum sulfonate was purchased from Guangzhou Lihou Trading Co., Ltd., item number: T106. The zinc dialkyldithiophosphate was purchased from Kunshan Shengan Biotechnology Co., Ltd., CAS number: 68649-42-3, article number: ZDDP, and the friction coefficient of the zinc dialkyl dithiophosphate was 0.08, the coefficient of friction is obtained by referring to the test method of SH/T0190-1992. The organic molybdenum is molybdenum dialkyl dithiophosphate, the molybdenum dialkyl dithiophosphate was purchased from Hangzhou Stern Chemical Co., Ltd., CAS No.: 72030-25-2, the coefficient of friction of the molybdenum dialkyl dithiophosphate is 0.06, and the coefficient of friction is obtained by referring to the test method of SH/T0190-1992. The alkyl diphenylamine was purchased from Hubei Xinkang Pharmaceutical Chemical Co., Ltd., CAS number: 68921-45-9. The polymethacrylate was purchased from Jinzhou Shengda Chemicals Co., Ltd., item number: T602, referring to GB/T265, and its kinematic viscosity at 100° C. was 400 mm²/S.

The second aspect of this embodiment provides the preparation method of lubricating regulating oil, the preparation method of the lubricating regulating oil is mixing and stirring mineral oil, calcium petroleum sulfonate, zinc dialkyl dithiophosphate, organic molybdenum, alkyl diphenylamine and polymethacrylate, and then it is obtained.

Embodiment 11

A kind of broadband vibration motor based on Embodiment 1, wherein, the difference is that the lubricating regulating oil includes 97 parts of mineral oil and 1.8 parts of polymethacrylate by weight. The mineral oil was purchased from Jinan Danlong Chemical Co., Ltd., model: 3-100. The polymethacrylate was purchased from Jinzhou Shengda Chemicals Co., Ltd., item number: T602, referring to GB/T265, and its kinematic viscosity at 100° C. was 400 mm²/S.

The second aspect of this embodiment provides the preparation method of lubricating regulating oil, the preparation method of the lubricating regulating oil is mixing and stirring mineral oil and polymethacrylate, and then it is obtained.

Performance Test

Performance Test 1

Referring to GB/T265, the lubrication regulating oils in Embodiment 3, Embodiment 4, Embodiment 10 and Performance Test 3

The lubricating regulating oils in Embodiments 3 to 11 are applied to the same broadband vibration motor, and placed in an environment of 40° C. for 12 hours, then power is turned on, and it is recorded whether there is noise and whether the vibration is stable when the motor vibrates, the rate of change of vibration per unit time is within 10% as stable, and the rest is considered unstable. The test results are shown in Table 2. The lubricating regulating oils in Embodiments 3 to 13 are applied to the same linear motor, and placed in an environment of 0° C. for 12 hours, then power is turned on, it is recorded whether there is noise and whether the vibration is stable when the motor vibrates, the rate of change of vibration per unit time is within 10% as stable, and the rest is considered unstable. The test results are shown in Table 2.

Performance Test 4

The lubricating regulating oil in Embodiments 3 to 11 are applied in the same linear motor, and the highest vibration amount and vibration frequency width are tested with reference to the fixed voltage frequency sweep test method. When the vibration frequency is 500 Hz, there is still vibration, and the vibration frequency width is recorded as qualified. When the vibration frequency is 500 Hz, there is no vibration, and the vibration frequency width is recorded as unqualified. The test results are shown in Table 2.

TABLE 1

| | −15° C. Kinematic Viscosity (mm²/S) | 23° C. Kinematic Viscosity (mm²/S) | 40° C. Kinematic Viscosity (mm²/S) | Solid content (wt %) |
|---|---|---|---|---|
| Embodiment 3 | 757 | 65.24 | 30.9 | 99.15 |
| Embodiment 4 | 762 | 65.42 | 31 | 99.21 |
| Embodiment 10 | 675.8 | 68.8 | 31 | 98.13 |
| Embodiment 11 | 929.1 | 65.5 | 30.7 | 99.61 |

TABLE 2

| | 40° C. | | 0° C. | | | |
|---|---|---|---|---|---|---|
| | Is there any noise | vibration stability | Is there any noise | vibration stability | Maximum Vibration (Grms) | Vibration width |
| Embodiment 3 | no | stable | no | stable | 1.05 | qualified |
| Embodiment 4 | no | stable | no | stable | 1.06 | qualified |
| Embodiment 5 | no | stable | no | stable | 1.04 | qualified |
| Embodiment 6 | no | unstable | no | unstable | 0.89 | unqualified |
| Embodiment 7 | yes | unstable | yes | unstable | 0.91 | unqualified |
| Embodiment 8 | no | unstable | no | unstable | 0.88 | unqualified |
| Embodiment 9 | yes | unstable | yes | unstable | 0.92 | unqualified |
| Embodiment 10 | yes | unstable | yes | unstable | 0.96 | unqualified |
| Embodiment 11 | yes | unstable | yes | unstable | 0.86 | unqualified |

Embodiment 11 were tested for their kinematic viscosity at −15° C., 23° C. and 40° C. respectively. The test results are shown in Table 1.

Performance Test 2

The lubricating regulating oils in Embodiment 3, Embodiment 4, Embodiment 10 and Embodiment 11 are weighed at normal temperature and recorded as m1, then the lubricating regulating oils are placed in a thermostat at 105° C. for 4 hours, and then weighed and recorded as m2, solid content= [(m1-m2)/m1]*100%, the test results are shown in Table 1.

Figure 26:
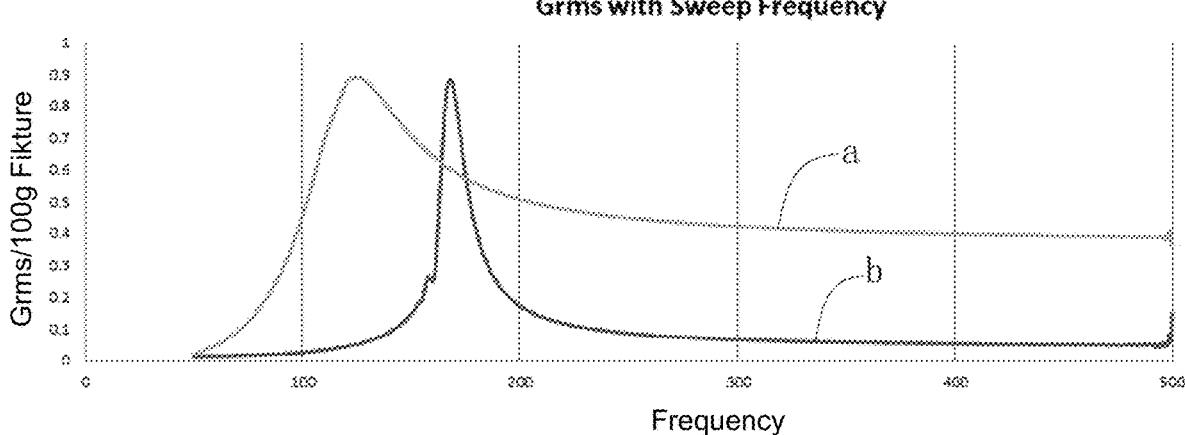
FIG. 26 is a comparison diagram of the vibration amount of a broadband vibration motor according to an embodiment of the present application and a traditional linear motor.

In addition, the broadband vibration motor of the present application has a larger vibration amount (vibration acceleration). Referring to FIG. 26, FIG. 26 shows a comparison chart of the vibration amount curves of the broadband vibration motor described in Embodiment 1 and the traditional linear motor. In FIG. 26, curve a is a graph of the vibration amount of the broadband vibration motor according to Embodiment 1 of the present application; the vibrator of the broadband vibration motor is formed by connecting a magnetic part 38 and a magnetically conductive part 39. Curve b is a graph of the vibration amount of a traditional linear motor that drives the vibrator 3 to reset by a spring, and the vibrator 3 is connected by multiple magnets and magnetically conductive parts; it may be seen from the figure that the vibration of the broadband vibration motor of the present application is larger, and the resonance frequency point (F0, Resonance Frequency) is lower, and the effective bandwidth (the frequency bandwidth of acceleration greater than or equal to 0.4 Grms, the human body has a clear perception of vibrations greater than or equal to 0.4 Grms) wider, with better broadband performance.

The present application also proposes an electronic device, which includes the above-mentioned broadband vibration motor, and generates vibration feedback during, for example, a process of human-computer interaction. The electronic device is, for example, a mobile phone, a tablet computer, a wearable device, a navigator, an intelligent hardware device, a game controller or a VR device, and the like.

In summary, the beneficial effects of some embodiments in this application are as follows:

1. By setting at least one reset part at both ends of the vibration direction of the vibrator, the reset part is arranged with its pole opposite to the same pole of the vibrator, so that the reset part may drive the vibrator to reset through magnetic repulsion; the lubricating regulating oil is provided on the outer peripheral surface of the vibrator, and the vibrator is suspended in the inner cavity, through the lubricating regulating oil, and the lubricating regulating oil may be used to provide lubricating damping, and it does not need to be provided with reset flexure spring or springs, so it is beneficial to prolong the service life of the broadband vibration motor, improve working reliability and reduce noise.

2. In some embodiments, lubricating regulating oil is used as the vibration transmission medium of the vibrator, the kinematic viscosity of the lubricating regulating oil at $-15°$ C. is $680{\sim}900$ mm$^2$/S, the kinematic viscosity at $23°$ C. is $60{\sim}65.5$ mm$^2$/S, and the kinematic viscosity at $40°$ C. is $30{\sim}35$ mm$^2$/S, which may improve the lubrication and damping performance, and the lubrication and damping effect is stable, the noise is low, and the reliability is strong; especially at a certain temperature and a certain viscosity, the lubrication and damping effect of the lubricating regulating oil is excellent; the interaction force between the lubricating regulating oil and the inner wall is in a stable state when sliding, and there is no sudden change of force during the movement of the magnetic parts, making the lubricating damping effect stable and noiseless, and the lubricating regulating oil is used instead of the traditional spring vibration conduction prevents the problem of spring breakage, ensuring a longer service life of the broadband vibration motor.

3. In some embodiments, the vibrator is an integral part formed by magnetization, and its processing accuracy is easier to guarantee through traditional processing technology: compared with the vibrator connected by multiple magnets and magnetically conductive parts, it saves the steps of assembling the vibrator, and the assembly is more convenient; at the same time, its dimensional accuracy is higher, and when connecting with other components of the broadband vibration motor, the assembly accuracy is also higher, and the reliability of the broadband vibration motor is also better.

4. In some embodiments, the thickness of the non-magnetic part may be made smaller than that of the traditional magnetic part of the vibrator; correspondingly, the thickness of the magnet part may be made larger, thereby improving the magnetic force of the vibrator and reducing the size of the vibrator; the volume is beneficial to the miniaturization of the broadband vibration motor.

5. In some embodiments, the vibrator includes a fixed piece that is fixedly connected to the surface of the magnetic part; by setting the fixed piece, two or more magnetic parts are fixedly connected through a rigid piece, which may absorb tension and shear force; the incoming load increases the structural strength and reduces the risk of the vibrator breaking when it encounters a fall or severe impact.

The foregoing is only a specific embodiment of the present application, and any other improvements made based on the concept of the present application are deemed to be within the protection scope of the present application.

What is claimed is:

1. A broadband vibration motor, comprising:
a case, comprising an inner cavity;
a vibrator, arranged in the inner cavity, wherein the outer peripheral surface of the vibrator is provided with lubricating regulating oil, and the vibrator is suspended in the inner cavity through the lubricating regulating oil, wherein kinematic viscosity of the lubricating regulating oil at $-15°$ C. is $680{\sim}900$ mm$^2$/S, and kinematic viscosity of the lubricating regulating oil at $23°$ C. is $60{\sim}65.5$ mm$^2$/S, and kinematic viscosity of the lubricating regulating oil at $40°$ C. is $30{\sim}35$ mm$^2$/S;
a coil, configured to drive the vibrator to vibrate, wherein the coil is arranged around an outside of the vibrator; and
at least one reset part, wherein the at least one reset part is magnetic, and the at least one reset part is correspondingly provided at both ends of the vibrator in the vibrating direction, and the at least one reset part is arranged with the same pole opposite to the vibrator.

2. The broadband vibration motor of claim 1, wherein the lubricating regulating oil is filled between an outer peripheral surface of the vibrator and an inner wall of the case; or
the broadband vibration motor further comprises a guide sleeve relatively fixed to the case, the guide sleeve is provided with a guide hole, and the vibrator is slidably fitted in the guide hole, the lubricating regulating oil is filled between the vibrator and the guide sleeve.

3. An electronic device, comprising the broadband vibration motor of claim 1.

4. The broadband vibration motor of claim 1, wherein the coil is arranged in the inner cavity or surrounds outside the case.

5. The broadband vibration motor of claim 4, wherein the case further comprises end covers sealing both ends of the inner cavity, and the reset part is connected to the end cover.

6. The broadband vibration motor of claim 1, wherein the vibrator is a single part, which comprises at least two magnet parts and a non-magnetic part between two adjacent magnet parts; the magnetic poles of the magnet part is arranged along the vibration axis of the vibrator, and the non-magnetic part is also arranged along the vibration axis of the vibrator; the two magnetic poles of two adjacent magnet parts have the same polarity, and the at least one reset part is arranged with the same pole opposite to the magnet part at the end of the vibrator.

7. The broadband vibration motor of claim 6, wherein the coil is arranged around the outer circumference of the non-magnetic part, and a thickness of the coil is greater than or equal to a thickness of the non-magnetic part.

8. The broadband vibration motor of claim 6, wherein the outer peripheral surface of the vibrator is provided with a groove;

the groove is annular and arranged around the outer peripheral surface of the vibrator;

or the groove is strip-shaped, the outer peripheral surface of the vibrator comprises a plurality of side surfaces, at least one of the side surfaces is provided with the groove.

9. The broadband vibration motor of claim 1, wherein the vibrator comprises at least two magnetic parts and a magnetically conductive part connected between the two magnetic parts, the range where the coil surrounds the vibrator comprises the magnetically conductive part; the at least one reset part is set with the same pole opposite to the magnetic part at the end of the vibrator.

10. The broadband vibration motor of claim 9, wherein the at least one reset part is provided with a central opening or the at least one reset part is solid, and a size of an end surface of the at least one reset part is greater than or equal to a size of an end surface of the magnetic part located at an end of the vibrator.

11. The broadband vibration motor of claim 9, wherein the vibrator further comprises a fixed piece, and the fixed piece is fixedly connected to the surface of the magnetic part.

12. The broadband vibration motor of claim 11, wherein a thickness of the fixed piece is 0.01-0.3 mm; a material of the fixed piece is a non-magnetic stainless steel material, a non-magnetic alloy material or a non-magnetic polymer material.

13. The broadband vibration motor of claim 1, wherein solid content of the lubricating regulating oil is 99-99.5 wt % after being placed at 100-110° C. for 3.5-4.5 hours.

14. The broadband vibration motor of claim 13, wherein the lubricating regulating oil further comprises organic acid esters, and a weight ratio between the organic acid esters and mineral oil is 1: (60~100); viscosity of the organic acid esters at 100° C. is less than 1500 mm$^2$/S.

15. The broadband vibration motor of claim 13, wherein raw materials for the preparation of the lubricating regulating oil comprise at least 90-99 parts of mineral oil in parts by weight.

16. The broadband vibration motor of claim 15, wherein the mineral oil is a hydrocarbon, and the hydrocarbon is selected from one or more of linear hydrocarbons, branched hydrocarbons, substituted or unsubstituted cycloalkanes or aromatics.

17. The broadband vibration motor of claim 13, wherein the lubricating regulating oil further comprises an organometallic compound, and a friction coefficient of the organometallic compound is 0.04-0.12.

18. The broadband vibration motor of claim 17, wherein the organometallic compound is an organozinc compound and/or an organomolybdenum compound.

19. The broadband vibration motor of claim 18, wherein the organomolybdenum compound is one or more of molybdenum dialkyl dithiophosphate, nitrogen-containing molybdenum dialkyl dithiophosphate, dialkyl dithiophosphate molybdenum thiocarbamate, molybdenum amine complex, molybdenum naphthenate or molybdenum alkyl salicylate.

* * * * *